United States Patent
Al-Haik

(10) Patent No.: US 11,840,057 B2
(45) Date of Patent: Dec. 12, 2023

(54) METAL ORGANIC FRAMEWORK MODIFICATIONS OF STRUCTURAL FIBERS

(71) Applicant: Embry-Riddle Aeronautical University, Inc., Daytona Beach, FL (US)

(72) Inventor: Marwan Al-Haik, Port Orange, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 0 days.

(21) Appl. No.: 17/685,003

(22) Filed: Mar. 2, 2022

(65) Prior Publication Data
US 2022/0388277 A1 Dec. 8, 2022

Related U.S. Application Data

(60) Provisional application No. 63/155,579, filed on Mar. 2, 2021.

(51) Int. Cl.
*B32B 9/04* (2006.01)
*B32B 7/12* (2006.01)
*B32B 37/12* (2006.01)
*B32B 5/02* (2006.01)

(52) U.S. Cl.
CPC .............. *B32B 9/045* (2013.01); *B32B 5/024* (2013.01); *B32B 7/12* (2013.01); *B32B 37/12* (2013.01); *B32B 2262/106* (2013.01); *B32B 2305/188* (2013.01)

(58) Field of Classification Search
CPC ........... B32B 9/045; B32B 5/024; B32B 7/12; B32B 37/12; B32B 2262/106; B32B 2305/188
See application file for complete search history.

(56) References Cited

U.S. PATENT DOCUMENTS

| | | | |
|---|---|---|---|
| 10,815,583 B2 | 10/2020 | Bullington et al. | |
| 10,828,868 B2 | 11/2020 | Walsh et al. | |
| 10,836,132 B2 | 11/2020 | Vlassiouk et al. | |
| 2021/0098203 A1* | 4/2021 | Dinca | H01G 11/62 |

FOREIGN PATENT DOCUMENTS

| | | | | |
|---|---|---|---|---|
| CN | 105133317 A | | 12/2015 | |
| CN | 107201645 A | | 9/2017 | |
| CN | 107794767 A | | 3/2018 | |
| CN | 108767247 A | * | 11/2018 | ............ H01M 4/364 |
| CN | 109354137 A | * | 2/2019 | ............ C02F 1/4691 |
| CN | 110136998 A | * | 8/2019 | ............ D06M 15/37 |
| CN | 110938407 A | * | 3/2020 | ............ C01B 32/158 |

OTHER PUBLICATIONS

Machine Translation of CN 110136998 A, Nie (Year: 2019).*
Machine Translation of CN 109354137 A, Shi (Year: 2019).*
Machine Translation of CN 108767247 A, Zhu (Year: 2018).*
Machine Translation of Li et al. CN 110938407 A (Year: 2020).*
"Unlock the Full Potential of Your Digital Future", Frost & Sullivan White Paper, (2021), 20 pgs.
Bhatt, Pooja, et al., "Carbon Fibres: Production, Properties and Potential Use", Material Science Research India, 14(1), (2017), 52-57.
Boon, Yi Di, et al., "A review of methods for improving interlaminar interfaces and fracture toughness of laminated composites", Materials Today Communications, vol. 22, 100830, (Mar. 2020).
Lester, Clifford, et al., "Composite Materials: Advantages and Cost Factors", Elevated Materials White Pages [online]. Retrieved from the Internet: <URL: http://www.elevatedmaterials.com/wp-content/uploads/2018/04/White-Paper-1-CFRP-Advantages-Cost-Factors.pdf>, (Mar. 21, 2018), 1-4.
Li, Ying, et al., "Constructing nanosheet-like MOF on the carbon fiber surfaces for improving the interfacial properties of carbo fiber /epoxy composites", Applied Surface Science, vol. 514, 145870, (2020), 1-7.
Wisnom, M. R., et al., "The role of delamination in failure of fibre-reinforced composites", Philosophical Transactions of the Royal Society A—Mathematical, Physical and Engineering Sciences, 370, (2012), 1850-1870.
Yang, X., et al., "Building Nanoporous Metal-Organic Frameworks "Armor" on Fibers", ACS Appl. Mater. Interfaces, 9, (2017), 5590-5599.

* cited by examiner

*Primary Examiner* — Callie E Shosho
*Assistant Examiner* — Bethany M Miller
(74) *Attorney, Agent, or Firm* — Schwegman Lundberg & Woessner, P.A.

(57) ABSTRACT

A reinforced carbon composite can include a carbon substrate and a metal organic framework bonded to the carbon substrate. For example, a reinforced carbon composite can include a first layer, a second layer, and a resin adhered to the first layer and the second layer. The first layer can include a carbon substrate and a metal organic framework bonded to the carbon substrate. The second layer can include a carbon substrate and a metal organic framework bonded to the carbon substrate.

18 Claims, 26 Drawing Sheets

Immerse 3 Plates in Solution with Enough Concentration Per Carbon Fiber Area

Wrap CF Around a Glass Plate Do Acid Treatment

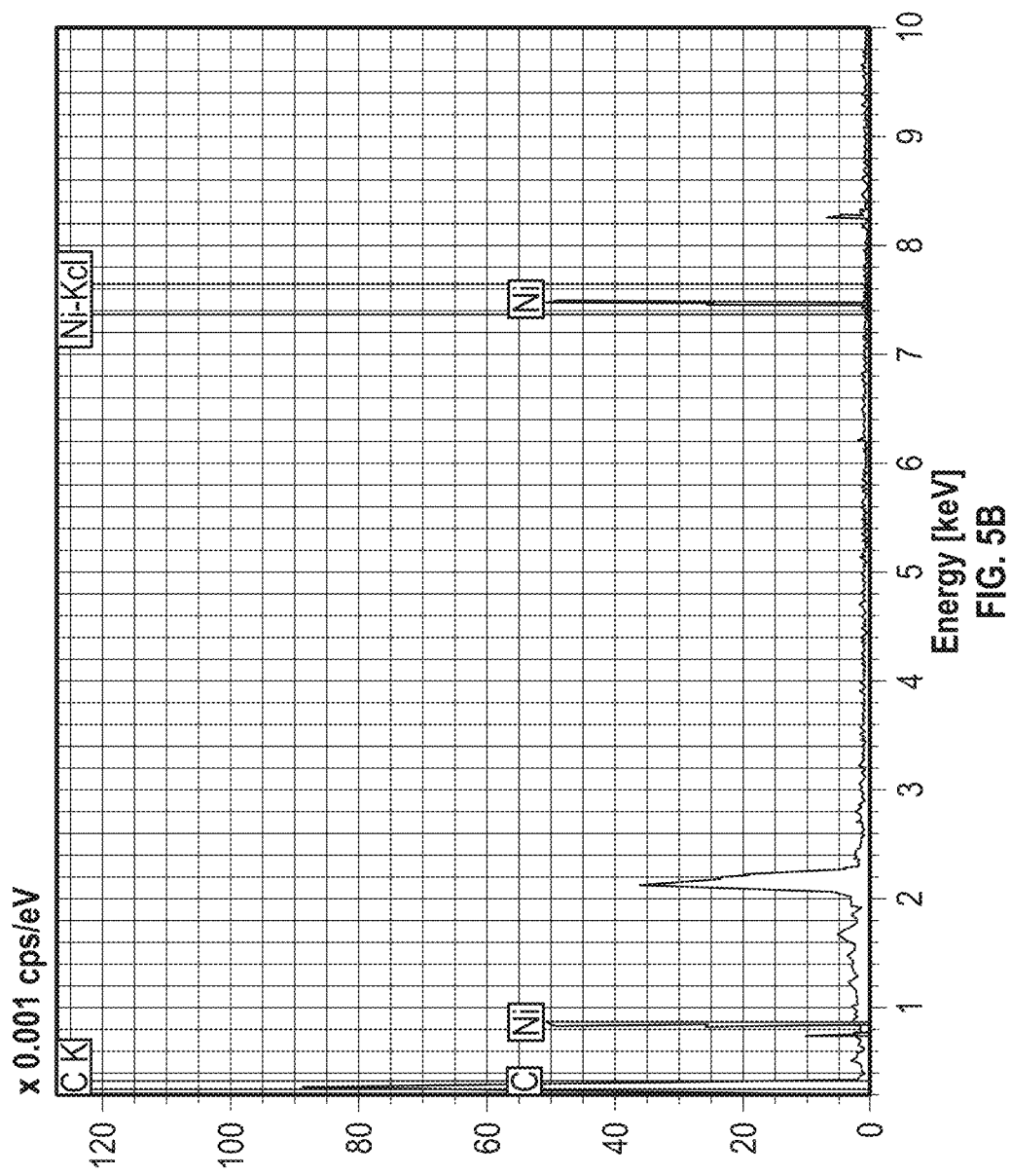

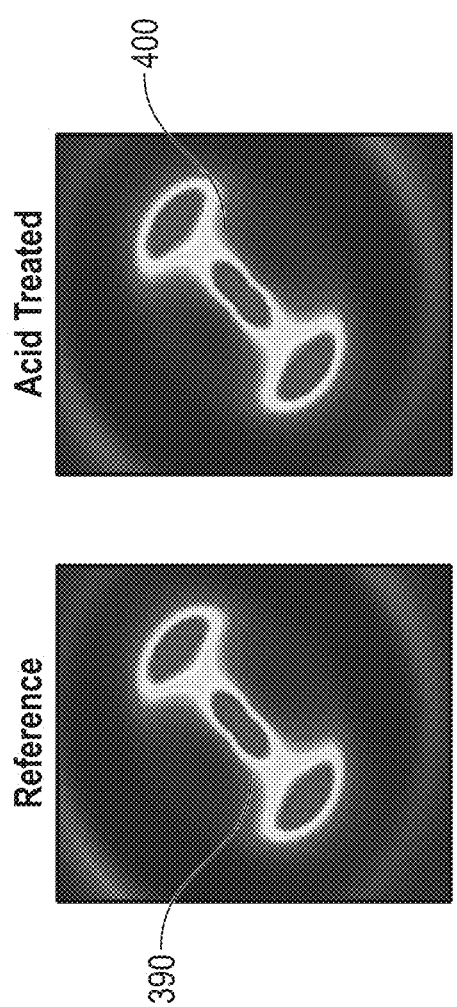
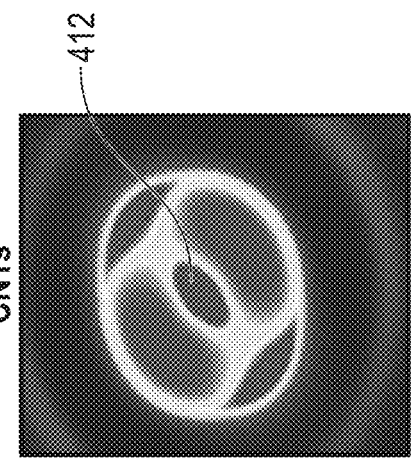
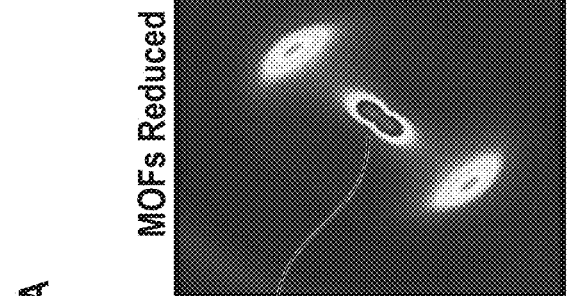
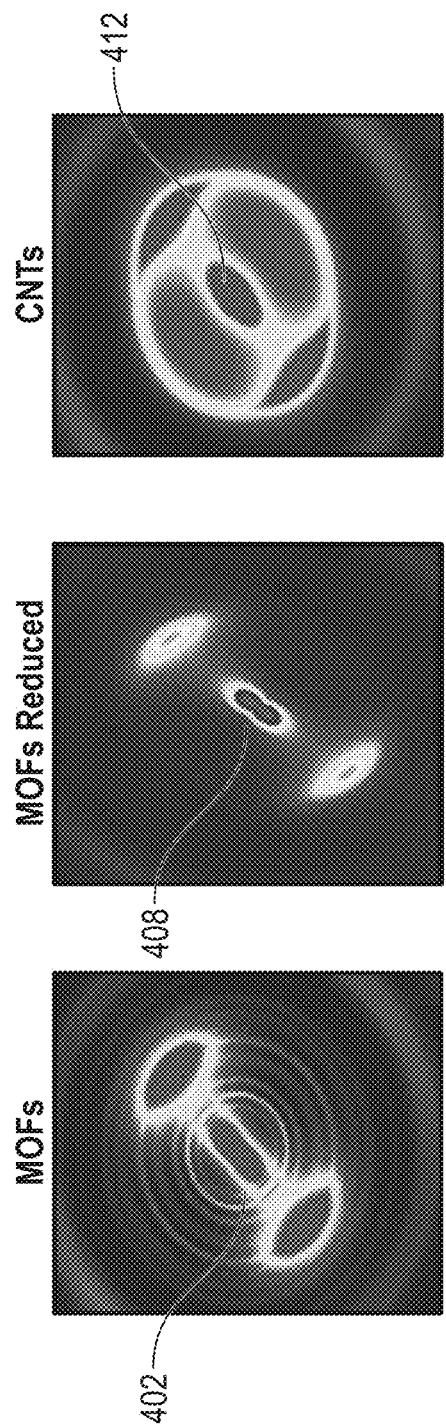
FIG. 7A Reference
FIG. 7B Acid Treated
FIG. 7C MOFs
FIG. 7D MOFs Reduced
FIG. 7E CNTs

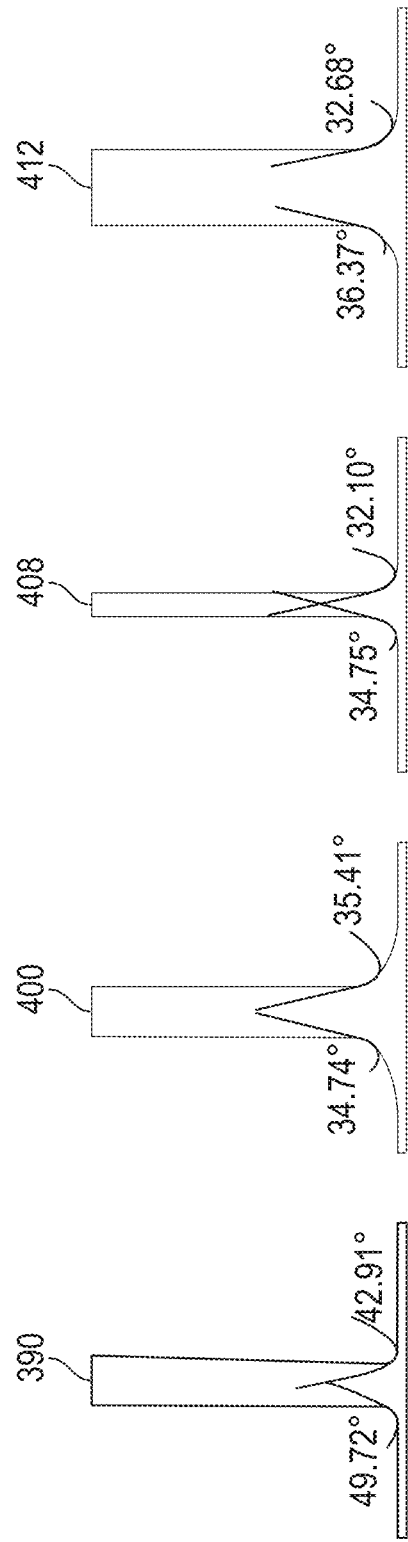

METAL ORGANIC FRAMEWORK MODIFICATIONS OF STRUCTURAL FIBERS

CLAIM OF PRIORITY

This patent application claims the benefit of priority, under 35 U.S.C. Section 119(e), to Marwan Al-Haik, U.S. Patent Application Ser. No. 63/155,579, entitled "METAL ORGANIC FRAME WORKS MODIFICATIONS OF STRUCTURAL FIBERS," filed on Mar. 2, 2021, which is hereby incorporated by reference herein in its entirety.

STATEMENT REGARDING FEDERALLY SPONSORED RESEARCH OR DEVELOPMENT

This invention was made with government support under award number Summer Faculty Fellowship Program (SFFP-2020) awarded by Air Force Research Laboratory (AFRL). The government has certain rights in this invention.

BACKGROUND

Lightweight materials are often used to improve fuel efficiency of vehicles such as bicycles, cars, aircraft, etc. For example, aluminum, titanium, and fiberglass have been commonly used in vehicles to lower the vehicle's weight while maintaining a strength high enough to withstand regular operation forces. Carbon fiber has weight and strength properties that make it a good candidate for such applications. As such, carbon fiber is commonly used in vehicles of many types.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5B illustrates a graph of the energy-dispersive X-ray spectroscopy of FIG. 5A.

FIG. 7A illustrates a wide-angle X-ray diffraction (WAXD) pattern of a reference sample carbon fiber.

FIG. 7B illustrates a WAXD pattern of an acid-treated carbon fiber sample.

FIG. 7C illustrates a WAX pattern of a carbon fiber sample with a MOF.

FIG. 7D illustrates a WAXD pattern of a carbon fiber sample with a reduced MOF.

FIG. 7E illustrates a WAXD pattern of a carbon fiber sample with metal-organic framework CNTs.

FIG. 13A illustrates a water meniscus around a reference carbon fiber sample.

FIG. 13B illustrates a water meniscus around an acid-treated carbon fiber sample.

FIG. 13C illustrates a water meniscus around a carbon fiber sample with MOFs.

FIG. 13D illustrates a water meniscus around a carbon fiber sample with CNTs.

DETAILED DESCRIPTION

Carbon fiber has weight and strength properties that make it a good candidate for use in vehicles of many types. Carbon fiber has been advanced significantly over the past 40 years. For example, many carbon fibers have been developed for their strength to weight ratios. However, carbon fiber reinforced polymeric composites (CFRPs) are prone to delamination due to insufficient interfacial properties. Several remedies have been attempted to enhance the fiber/matrix interfaces via chemical treatments or utilizing stiffer nanomaterials at the interface. However, some of these treatments are destructive in nature and others are non-scalable.

This disclosure helps to address the delamination issues by using a methodology for developing hybrid reinforcements that comprise carbon fibers and metal organic frameworks (MOFs). The growth of MOFs is both scalable, non-destructive to the carbon fibers, and tailorable to control porous morphologies of the MOFs at the interface. Furthermore, this disclosure demonstrates the feasibility of utilizing the MOFs as a catalyst to grow carbon nanotubes (CNTs) on the carbon fibers. Several mechanical characterizations including tensile, dynamic mechanical analysis and shear lap joint were carried out to discern the effects of the MOFs on the composite structural performance. Several improvements emanated from the MOFs placement on the interface including, improving the strength, enhancing the damping parameter by 500%, increasing the glass transition temperature of the composite by 20° C., and alleviating the shear lap joint strength by 40%.

Though the disclosure below discusses the use of carbon fiber as a substrate, glass fibers can substitute carbon fiber in any embodiment. Optionally, a mixture of glass fiber and carbon fibers can be used as a substrate.

The above discussion is intended to provide an overview of subject matter of the present patent application. It is not intended to provide an exclusive or exhaustive explanation of the invention. The description below provides further information about the present patent application.

Figure 1:
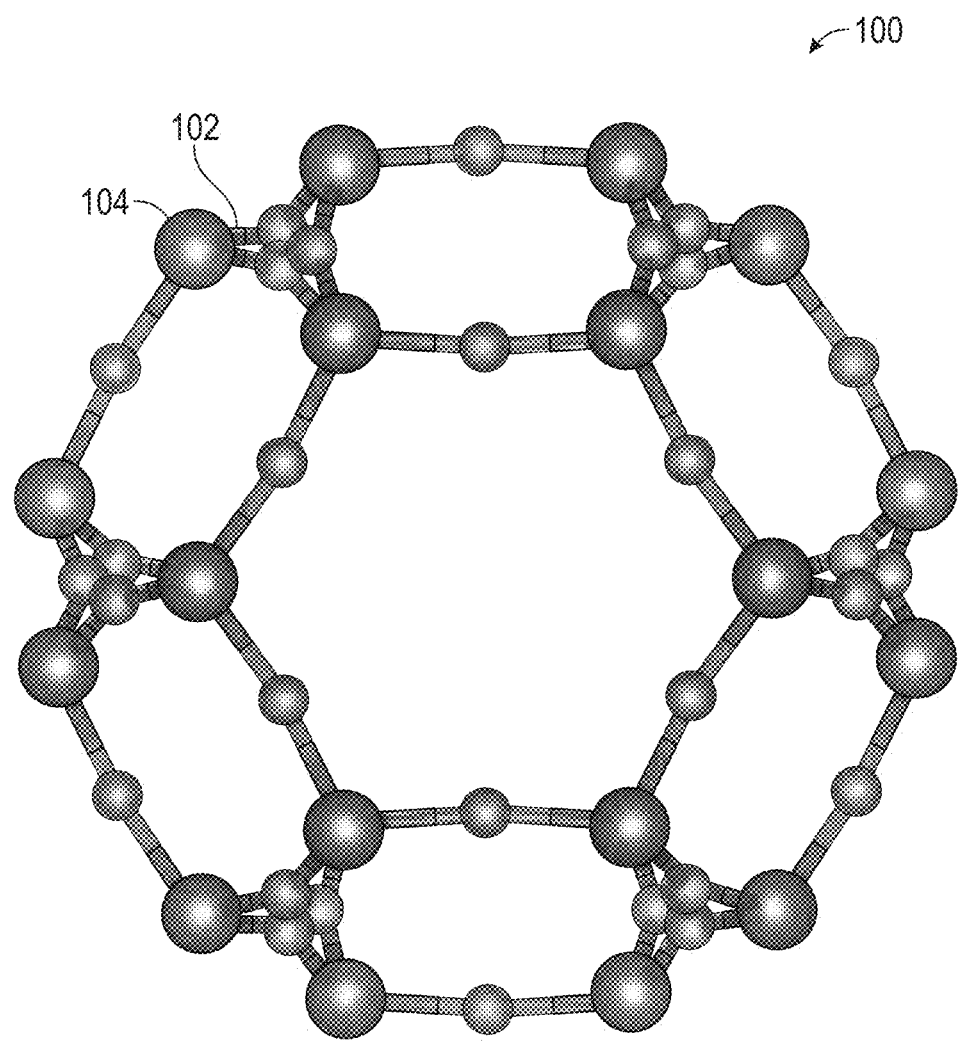
FIG. 1 illustrates a schematic view of a metal-organic framework (MOF).

FIG. 1 shows a schematic view of a MOF 100 illustrating an organic ligand 102 bonded to metallic nodes 104. The MOF 100 can be an organic-inorganic hybrid crystalline porous material. The MOF 100 can form an array of positively charged metal ions surrounded by organic linker molecules (e.g., organic ligand 102). The metal ions can form metallic nodes 104 that bind the arms of the organic ligand 102 together to form a repeating, cage-like structure. Due to this hollow structure, the MOF 100 can have an extraordinarily large surface area.

The MOF 100 has been previously utilized for non-structural applications. The MOF 100 with carbon materials can be used as catalysis, gas adsorption, or enhanced transport properties. For example, the MOF 100 and CNTs can form a porous catalyst used to detect urea. In another example, graphene, coated with the MOF 100, can be used as an effective water-splitting electro-catalyst. In yet another example, the MOF 100 can be a copper-based hybrid with graphene oxide. When the MOF 100 is a copper-based hybride with graphene oxide, the MOF 100 can be used for adsorbing toxic $H_2S$ gas.

Here, the MOF 100 can modify the surface of structural carbon fibers toward amplifying the interfacial properties of CFRPs. Moreover, nickel-based MOF 100 can be used as a catalyst to grow carbon nanotubes on carbon fibers.

Figure 2C:
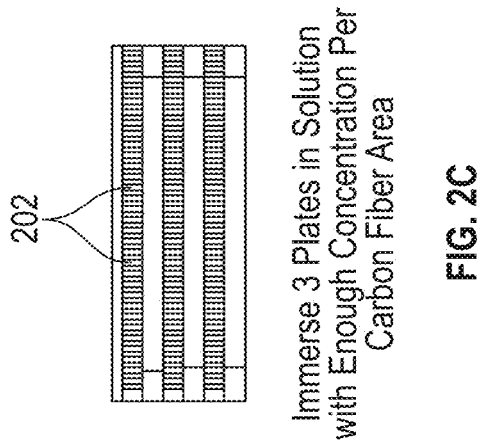
FIG. 2C illustrates an elevation view of an assembly of plates.
Figure 2B:
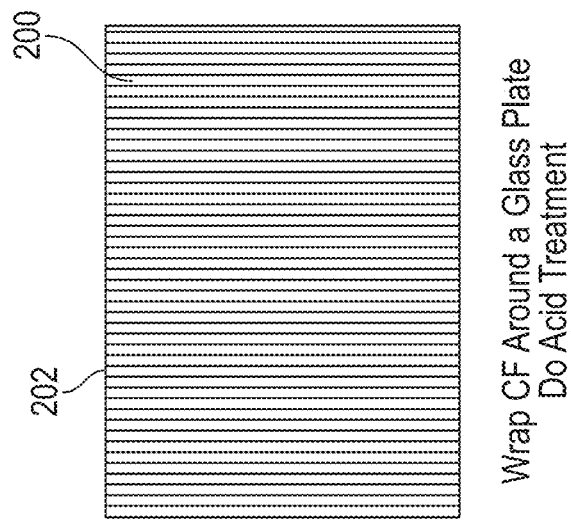
FIG. 2B illustrates a top view of carbon fiber wrapped around a plate.
Figure 2A:
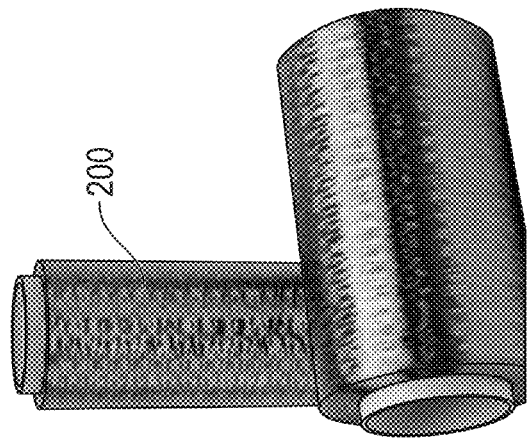
FIG. 2A illustrates a perspective view of spools of carbon fiber.

FIG. 2A illustrates a perspective view of a spool of carbon fiber 200. FIG. 2B illustrates a top view of the carbon fiber 200 wrapped around a plate 202. FIG. 2C illustrates an elevation view of an assembly of plates 202. FIGS. 2A-2C are discussed together below.

As shown in FIG. 2A, carbon fiber 200 can be wrapped around a core for storage and transportation. FIGS. 2A-2C show an example of carbon fiber 200 that can be bonded with the MOF 100 (FIG. 1), As shown in FIG. 2B, the carbon fiber 200 can be wrapped around the glass plate 202. Optionally, as shown in FIG. 2C multiple plates 202 can be stacked or arranged with space between the plates. One or more plates with carbon fiber wrapped around them can be immersed in a mixture to bond the MOF 100 to the carbon fiber 200.

Figure 3:
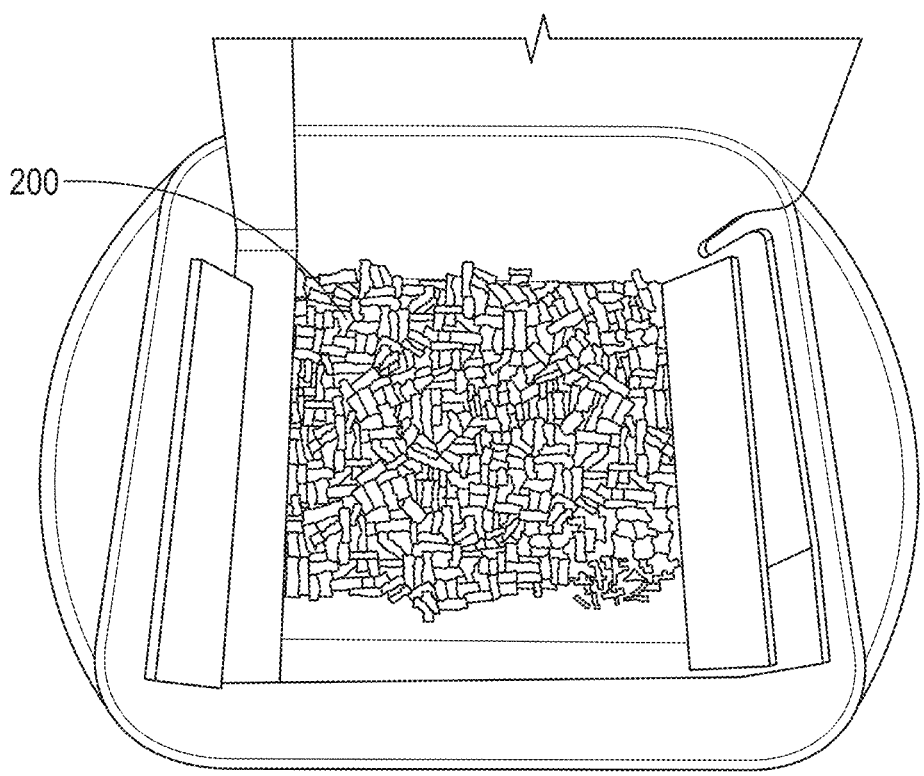
FIG. 3 illustrates a perspective view of chopped carbon fibers.

FIG. 3 illustrates a perspective view of shredded carbon fiber 200. The carbon fiber 200 can be formed in a woven fabric, for example, and can be shredded before being submersed in the MOF 100 solutions. To prepare the MOF 100 mixture, one solution can be made by dissolving the metal ion source, nickel nitrate hexahydrate (Ni $(NO_3)_2 \cdot 6H_2O$) in 100 mL of methanol to yield a 0.33 M concentration. The ligands solution can be made by dissolving 2-methylimidazole ($C_4H_6N_2$) in 100 mL of methanol: 0.14 M concentration. The metal ion source can use other metals, such as alkaline earth metals or transition metals, such as Cobalt Nitrate, Iron Nitrate, or the like. In other examples, the ligands solution can include any molecule that consists of a lone pair of electrons; for example some ligand solutions can consist of an —OH, —$NH_3$, —CO, or a combination thereof.

Various resins can be used, such as a thermoset, a thermoplastic, a phenolic, a vinyl ester, a polyimide resin, or the like. In some examples, the resin can be a polymeric resin. For example, the resin may be chosen from a diglycidyl ether of bisphenol F, a low epoxy equivalent weight diglycidyl ether of bisphenol A, a liquid epoxy novolac, a liquid aliphatic epoxy, a liquid cycloaliphatic epoxy, a 1,4-cyclohexandimethanoldiglycidylether, 3,4-epoxycyclohexylmethyl-3,4-epoxy cyclohexane carboxylate, tetraglycidylmethylenedianiline, N,N,N'N'-tetraglycidyl-4,4'-methylenebisbenzenamine, a triglycidyl of para-aminophenol, N,N,N',N'-tetraglycidyl-m-xylene diamine, or a mixture thereof.

In some examples, the acrylate resin may be chosen from a methacrylate, a methyl acrylate, an ethyl acrylate, a 2-chloroethyl vinyl ether, a 2-ethylhexyl acrylate, a hydroxyethyl methacrylate, a butyl acrylate, a butyl methacrylate, or a mixture thereof.

In some examples, the methacrylate may be chosen from 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth) acrylates including 2-(2-ethoxyethoxy)ethyl (meth)acrylate, 2-ethoxyethyl (meth)acrylate, 2-methoxyethoxyethyl (meth) acrylate, 2-methoxyethyl methacrylate, polyethylene glycol mono(meth)acrylates; alkyl vinyl ethers, including vinyl methyl ether; and mixtures thereof.

In some examples, the ethyl acrylate may be chosen from benzyl 2-ethyl acrylate; 2-(dimethylamino)ethyl acrylate; poly(ethyl acrylate) solution; 2-(diethylamino)ethyl acrylate; di(ethylene glycol) ethyl ether acrylate; poly(methyl methacrylate-co-ethyl acrylate); poly(tert-butyl acrylate-co-ethyl acrylate-co-methacrylic acid); 2-(4-benzoyl-3-hydroxyphenoxy)ethyl acrylate; poly(ethylene-co-ethyl acrylate); 2-[[(butylamino)carbonyl]oxy]ethyl acrylate; 2-(9H-carbazol-9-yl)ethyl acrylate; poly(9h-carbazole-9-ethyl acrylate); poly[(methyl methacrylate)-co-(9-H-carbazole-9-ethyl acrylate)]; ethyl 2-(hydroxymethyl)acrylate; ethyl cis-(β-cyano)acrylate; ethyl 2-(trimethylsilylmethyl)acrylate; ethyl 2-(bromomethyl)acrylate; ethyl(2e)-2-cyano-3-(1H-indolyl-3-yl)acrylate; ethyl 3-(n,n-dimethylamino)acrylate; ethyl 2-cyano-3,3-bis(methylthio)acrylate; and mixtures thereof.

In some examples, 2-ethylhexyl acrylate may be chosen from 2-Hydroxyethyl methacrylate; poly(2-hydroxyethyl methacrylate); phosphoric acid 2-hydroxyethyl methacrylate ester; and mixtures thereof.

In some examples, butyl acrylate may be chosen from tert-Butyl acrylate; poly(tert-butyl acrylate-co-ethyl acrylate-co-methacrylic acid); tert-Butyl 2-bromoacrylate; and mixtures thereof.

In some examples, butyl methacrylate may be chosen from tert-Butyl methacrylate; sec-butyl methacrylate; poly (butyl methacrylate); poly(butyl methacrylate-co-methyl methacrylate); poly(butyl methacrylate-co-isobutyl methacrylate); poly(tert-butyl methacrylate-co-glycidyl methacrylate); poly(tert-butyl methacrylate); poly(4-vinylpyridine-co-butyl methacrylate); poly[(propylmethacryl-heptaisobutyl-PSS)-co-(t-butyl methacrylate)]; poly [(propylmethacryl-heptaisobutyl-PSS)-co-(n-butyl methacrylate)]; diethylene glycol butyl ether methacrylate; 2-(3-(tert-butyl)-4-hydroxy-5-(5-methoxy-2H-benzo[d][1,2,3]triazol-2-yl)phenoxy)ethyl methacrylate; 3-(3-(tert-butyl)-4-hydroxy-5-(5-methoxy-2H-benzo[d][1,2,3]triazol-2-yl) phenoxy)propyl methacrylate; 2-(Dimethylamino)ethyl methacrylate; and mixtures thereof.

In some examples, the polysiloxane resin may be chosen from poly[dimethyl siloxane-co-methyl(3-hydroxypropyl) siloxane]-graft-poly(ethylene glycol) methyl ether, poly[dimethylsiloxane-co-methyl(stearoyloxyalkyl)siloxane], poly (methyl hydrogen siloxane), 1,1,3,3-tetramethyldisiloxane, and mixtures thereof.

Figure 4B:
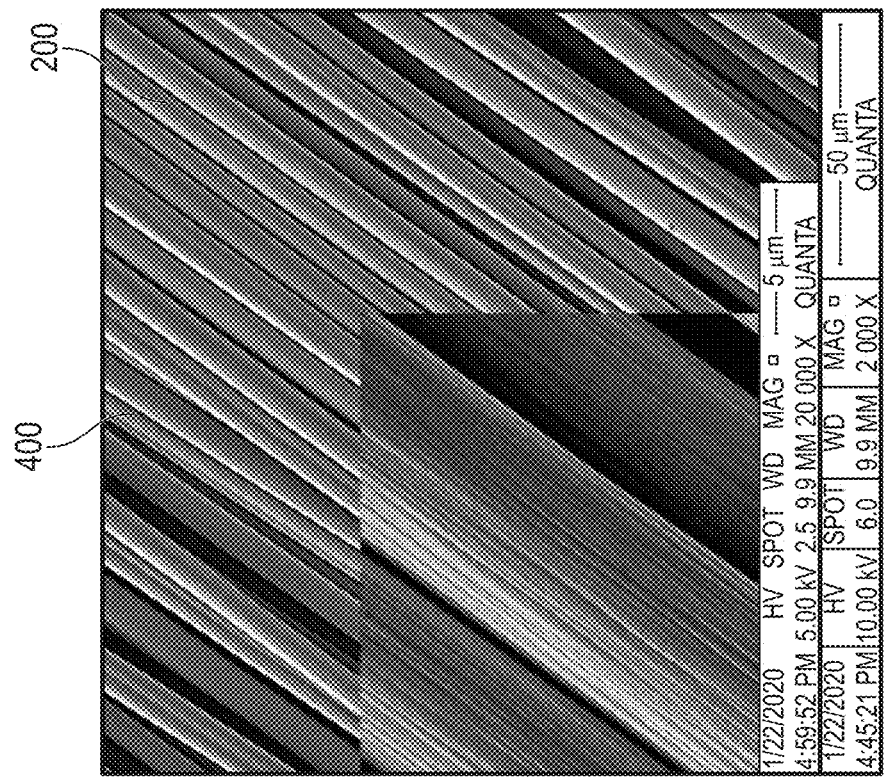
FIG. 4B illustrates a scanning electron microscopy micrograph of acid-treated carbon fiber.
Figure 4A:
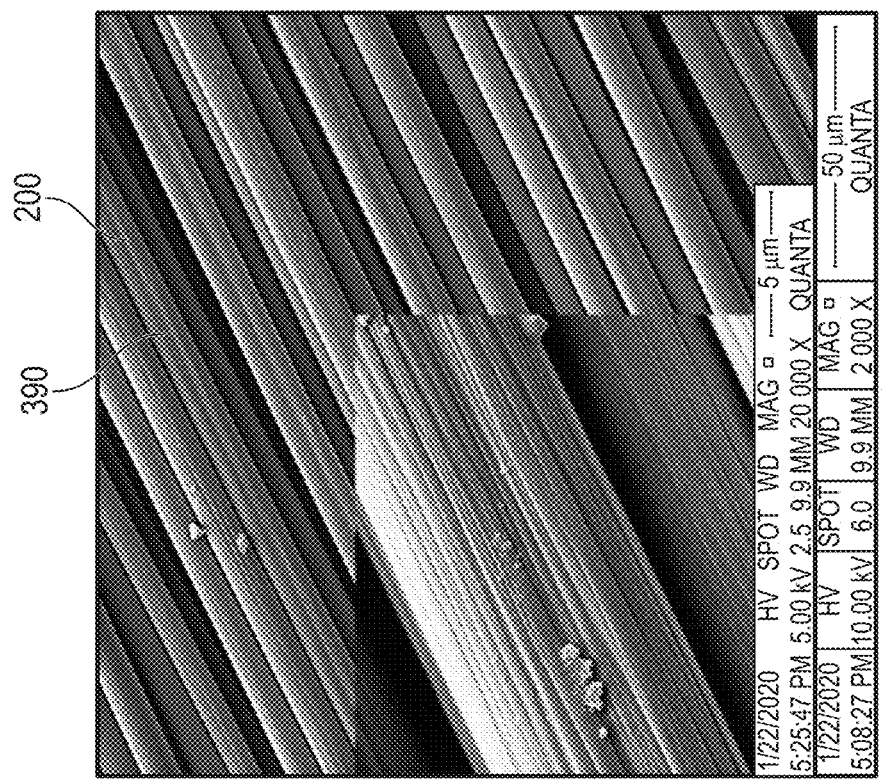
FIG. 4A illustrates a scanning electron microscopy micrograph of the carbon fiber with de-sized fibers.

FIG. 4A illustrates a scanning electron microscopy micrograph of the carbon fiber 200 with de-sized fibers. The carbon fibers 200 utilized can be de-sized, plain woven, structural, polyacrylonitrile (PAN) grade, Thornel-650, with 3 k bundles. The fibers can be de-sized inside a quartz tube furnace, at 550° C. for 30 mins under a nitrogen-induced inert environment. To allow the formation of active sites (—COOH), the fibers can be cut into 6"×6" squares and can be treated in a diluted mix (2:1) of de-ionized (DI) water/ $HNO_3$ acid for 24 hours. The fibers can be washed thoroughly with DI water till a of 7.0 was achieved, followed by drying in an oven at 100° C. for 24 hours. A reference sample of 390 can be made of the carbon fiber 200.

The peel-off, as shown in FIG. 4A, can indicate that de-sizing the T650 fibers under an inert thermal environment was a success. The carbon fiber 200 can be treated with the diluted $HNO_3$ solution dissolved in these de-sized peels; nitric acid is well known for introducing the carboxylic group (—COOH) to the fibers' surface. The acid treatment can also play an etching effect revealing several fibrils at the surface of the carbon fiber 200.

FIG. 4B illustrates a scanning electron microscopy micrograph of acid-treated carbon fiber sample 400. As shown in FIG. 4B, the surface of acid-treated carbon fiber 400 can be smooth and does not contain the peel-off demonstrated on the surface of the carbon fiber sample 400 in FIG. 4A.

Figures 4C, 4D:
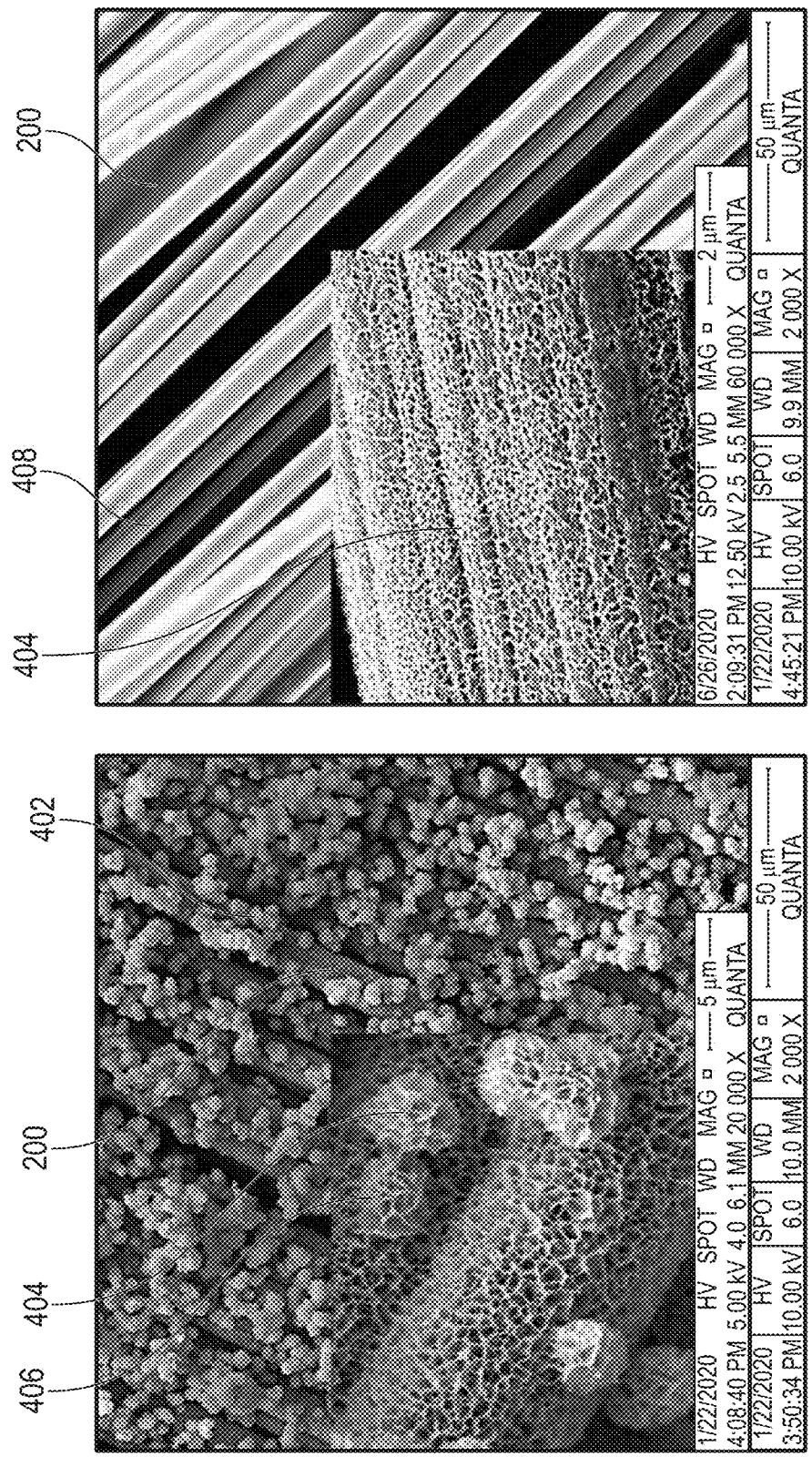
FIG. 4C illustrates a scanning electron microscopy micrograph of MOF growth with a concentration of 0.65 M MOFs.
FIG. 4D illustrates a scanning electron microscopy micrograph of MOF growth with a concentration of 0.33 M MOFs.

FIG. 4C illustrates scanning electron microscopy micrograph of a MOF coated carbon fiber sample 402 having a concentration of 0.65 M MOF 100 (FIG. 1). The MOF 100 porous structure shown in FIG. 4C can be formed utilizing a highly concentrated solution of the metal source. As shown in FIG. 4C pores 404 can be separated by thin sheet walls 406. The thin sheet walls 406 can be, for example, MOF 100. The thin sheet walls 406 can help highlight the pattern of the MOF 100 formed. Several factors can play roles in creating the different patterns of the MOF 100, such as the metal source concentration, the ligand utilized (e.g., organic ligand 102), the growth time, and the nature of the substrate. For example, decreasing the concentration of the MOF 100 of a metal-organic framework carbon fiber 402 can make the thin sheet walls 406 disappear.

FIG. 4D illustrates scanning electron microscopy micrograph of another reduced MOF coated carbon fiber sample 408 a concentration of 0.33 M MOF 100. As shown in FIG. 4D, decreasing the concentration of the MOF 100 can make the thin sheet walls 406 (shown in FIG. 4C) disappear.

Figure 4F:
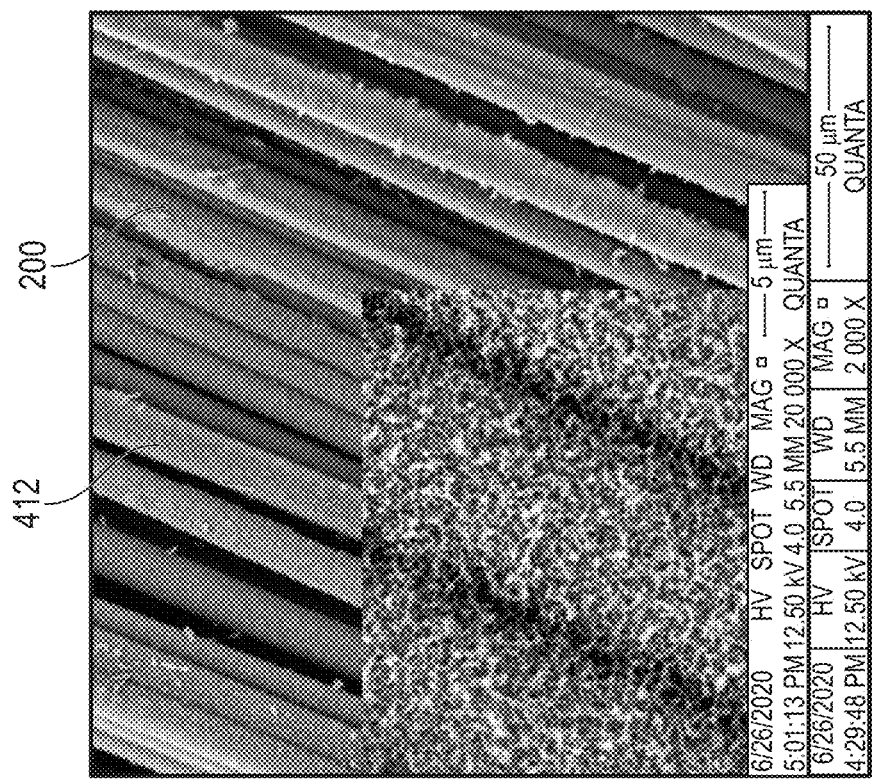
FIG. 4F illustrates scanning electron microscopy micrograph of CNTs growth based on fibers with 0.33 M MOFs concentration.
Figure 4E:
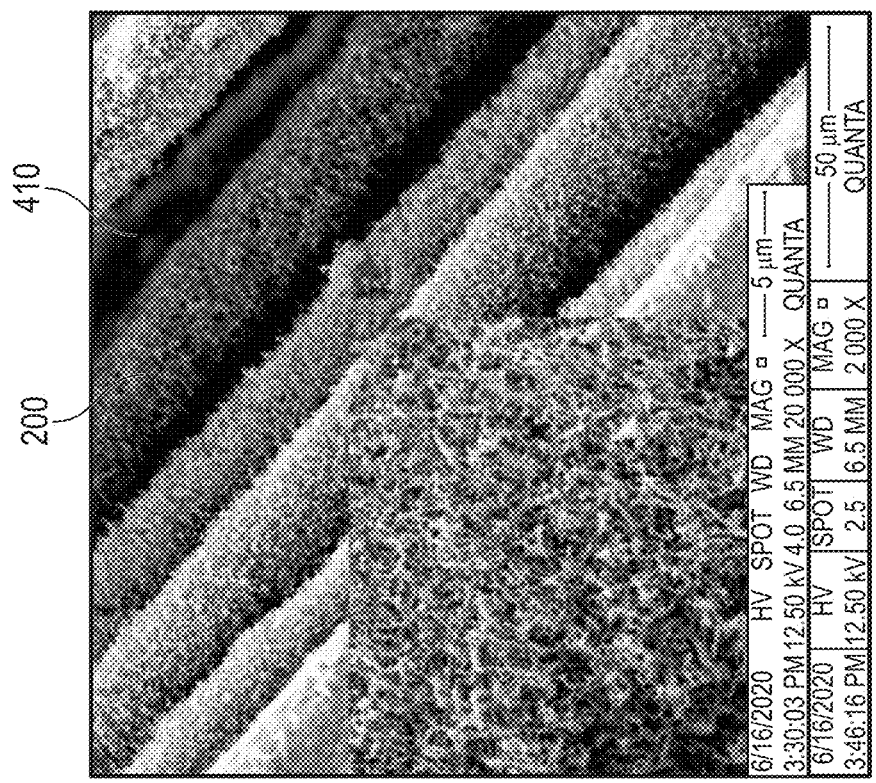
FIG. 4E illustrates scanning electron microscopy micrograph of carbon nanotubes (CNTs) growth based on fibers with 0.65 M MOFs concentration.

FIG. 4E illustrates scanning electron microscopy micrograph of a carbon fiber sample with CNTs 410 growth based on fibers with 0.65 M MOF 100 concentration. As shown in FIG. 4E, the dense MOF 100 (shown in FIG. 4C), can lead to dense CNTs growth that can enlarge fibers of the carbon fiber 200 to have diameters from 6.8 μm to almost 30.0 μm. The dense growth of the carbon fiber 200 on the carbon fiber sample with CNTs 410 can hinder the ability of the resin to wet the fibers and penetrate through the bundles.

FIG. 4F illustrates a scanning electron microscopy micrograph of a carbon fiber sample with CNTs 412 based on fibers with 0.33 M MOF 100 concentration. The less-dense the MOF 100 (shown in FIG. 4C) can be used to make less-dense CNT growth resulting in more uniform and less-dense growth of the CNT. The uniform and less-dense development can allow better flowability of epoxy between the fibers of the carbon fiber sample with CNTs 412.

Figure 5A:
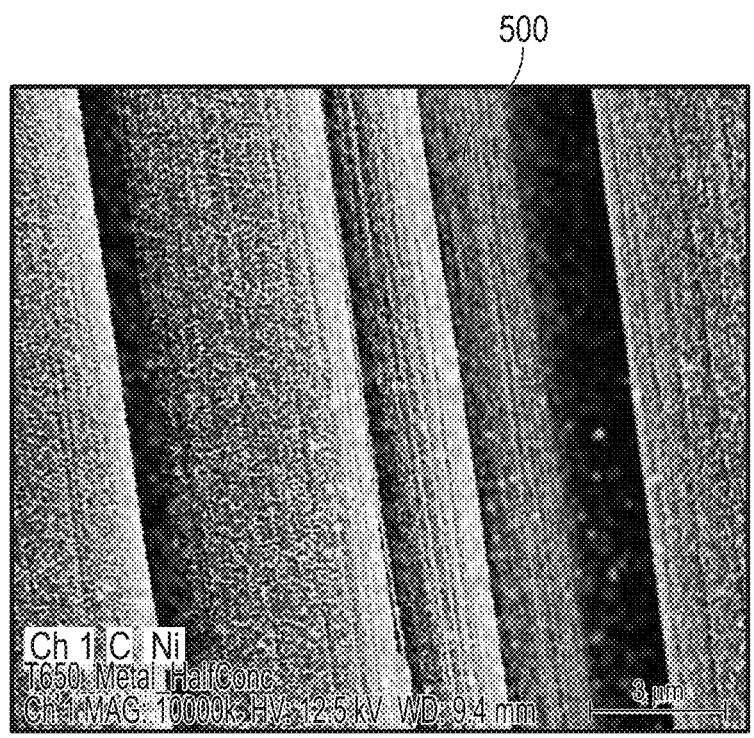
FIG. 5A illustrates an energy-dispersive X-ray spectroscopy of carbon fibers with MOFs revealed along strong peaks of crystalline nickel.
Figure 5C:
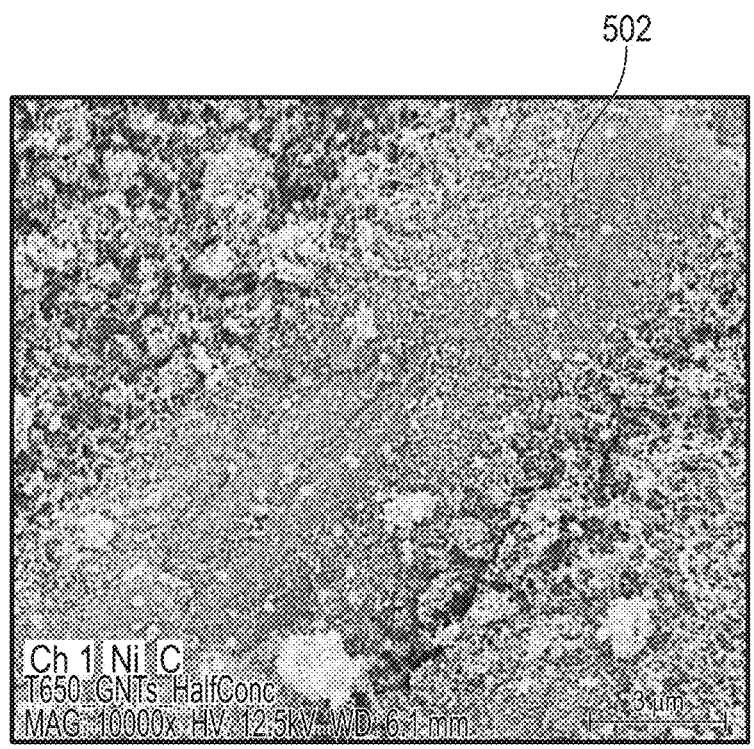
FIG. 5C illustrates an energy-dispersive X-ray spectroscopy of carbon fibers with MOFs after growing CNTs revealed along strong peaks of crystalline nickel.

FIG. 5A illustrates energy-dispersive X-ray spectroscopy of a sample 500 that can be made from the carbon fiber 200 with the MOF 100. (e.g., MOF coated carbon fiber sample 402 from FIG. 4C or the reduced MOF coated carbon fiber sample 408 from FIG. 4D. FIG. 5B illustrates a graph of the energy-dispersive X-ray spectroscopy of FIG. 5A. FIG. 5C illustrates energy-dispersive X-ray spectroscopy of a sample 502 that can be made from the carbon fiber 200 with the MOF 100 after growing CNTs (e.g., the carbon fiber sample with CNTs 410 of FIG. 4E the carbon fiber sample with CNTs 412 from FIG. 4F. FIG. SD illustrates a graph of the energy-dispersive X-ray spectroscopy of FIG. 5C. FIGS. 5A-5D will be discussed together below.

Figure 5D:
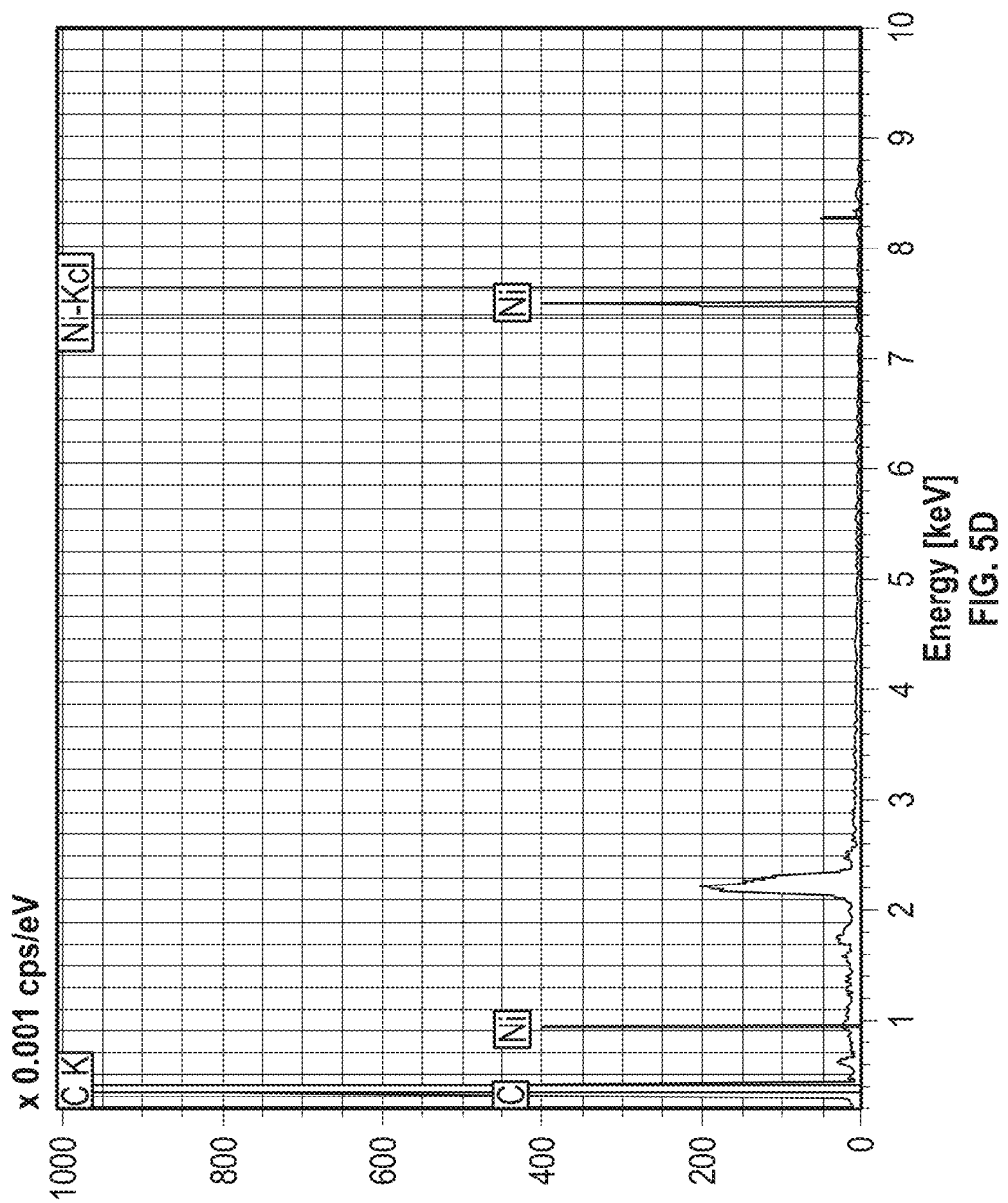
FIG. 5D illustrates a graph of the energy-dispersive X-ray spectroscopy of FIG. 5C.

As shown in FIGS. 5A and 5B, the energy-dispersive X-ray spectroscopy of the sample 500 can reveal strong peaks of crystalline nickel. As shown in FIGS. 5C and 5D, the carbon peak can become stronger because of the added CNTs atoms to the sample 502 and the MOF 100. Moreover, the Ni spots can become more contrasted because the reduction process, before CNTs grown of the sample 502, can assist in removing oxides that might have been developed during the MOF 100 depositions.

Figure 6:
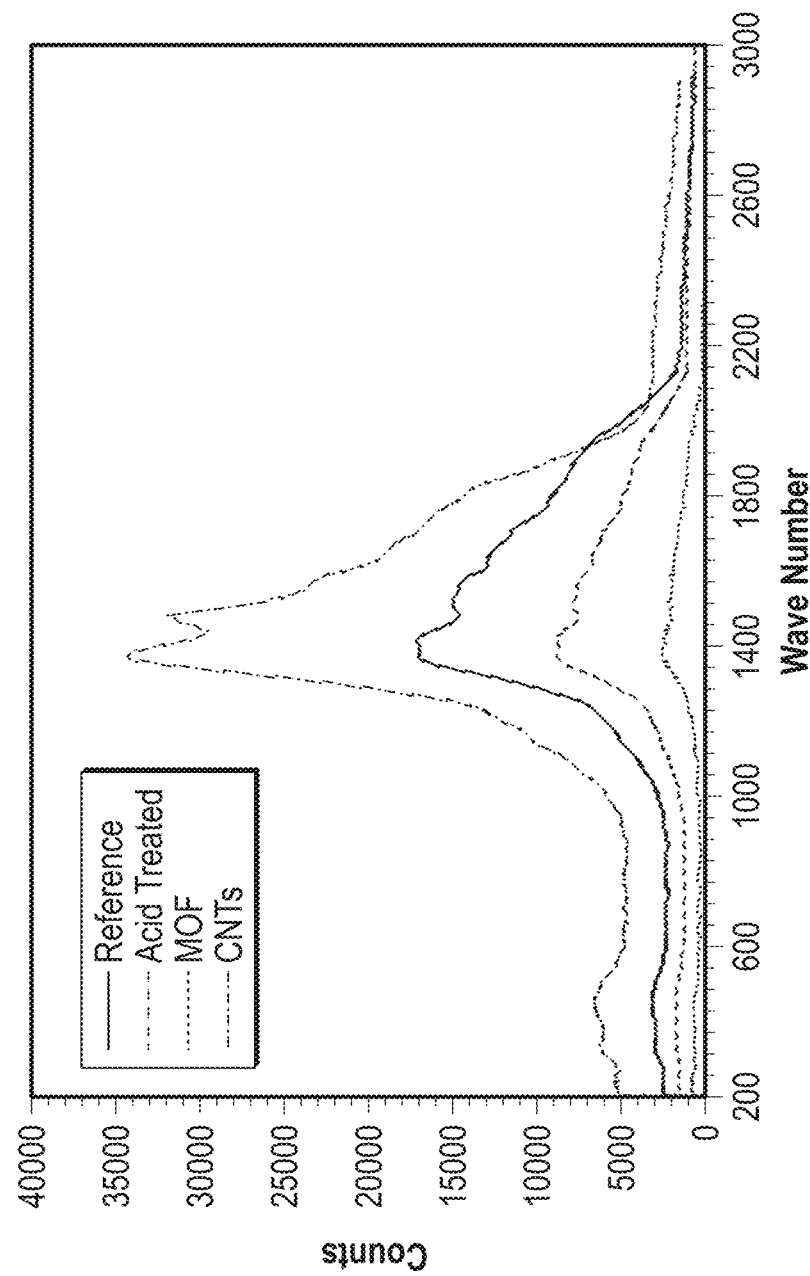
FIG. 6 illustrates a Raman spectrum of carbon fibers with different surface treatments.

FIG. 6 illustrates a Raman spectra of carbon fibers with different surface treatments. As shown in FIG. 6, the reference sample of the 390 can reveal a strong disordered graphitic peak (D; 1360 cm$^{-1}$) (D peak), and a much weaker ordered graphitic peak (G; 1580 cm$^{-1}$) (G peak). The lesser referred to peak can be at roughly 1500 cm$^{-1}$, which can indicate amorphous carbon. The acid-treated carbon fiber sample 400 can show reduced peaks of intensities of both D and G peaks. Further, the G peak can be broadened and shifted to a higher frequency because of the —COOH functional groups on the surface. The reduction in the G band intensity can indicate a reduced number of graphitic layers. As also shown in FIG. 6 with reference to the sample 500, the deposition of the MOF 100 on the carbon fiber 200 can mask the D and G peaks due to higher coverage of metal crystals. The spectra can also measure the absorption of the MOF 100. As also shown in FIG. 6 with reference to the sample 502, upon growing CNTs on a surface of the carbon fiber 200, a strong D-band at 1350 cm$^{-1}$ and G-band at 1595 cm$^{-1}$ can be apparent. An intensity ratio, $I_D/I_G$ can be more noticeable for the sample 502, indicating a high degree of crystallinity due to the presence of the CNTs.

FIG. 7A illustrates a WAXD pattern of the reference sample of carbon fiber 390. FIG. 7B illustrates a WAXD pattern of an acid-treated carbon fiber sample 400, FIG. 7C illustrates a WAXD pattern of the MOF coated carbon fiber sample 402. FIG. 7D illustrates a WAXD pattern of the reduced MOF carbon fiber sample 408. FIG. 7E illustrates a WAXD pattern of the carbon fiber sample with CNTs 412. FIGS. 7A-7E will be discussed concurrently below.

As shown in FIGS. 7A-7E show that the patterns can indicate a diffuse anisotropic scattering. FIGS. 7A and 7B show that the reference sample of carbon fiber 390 and the acid-treated carbon fiber sample 400 show a fan-like scattering typical for PAN-based carbon fibers. The needle-like pores on the fibers of the examples of FIGS. 7A and 7B can cause the scattering pattern. As shown in FIGS. 7A and 7B, the reference sample of carbon fiber 390 and acid-treated carbon fiber sample 400 can exhibit identical patterns, which indicates that the acid treatment did not alter the crystallinity of the fibers of the carbon fiber 200. The intensity distribution in the reciprocal space includes disks centered at the origin of that space with disks normal parallel to the principal axis of the pores. Disc thickness can be inversely related to the length of the pores. The fan-like shape can include a superposition of disks with finite thicknesses.

Figure 8:
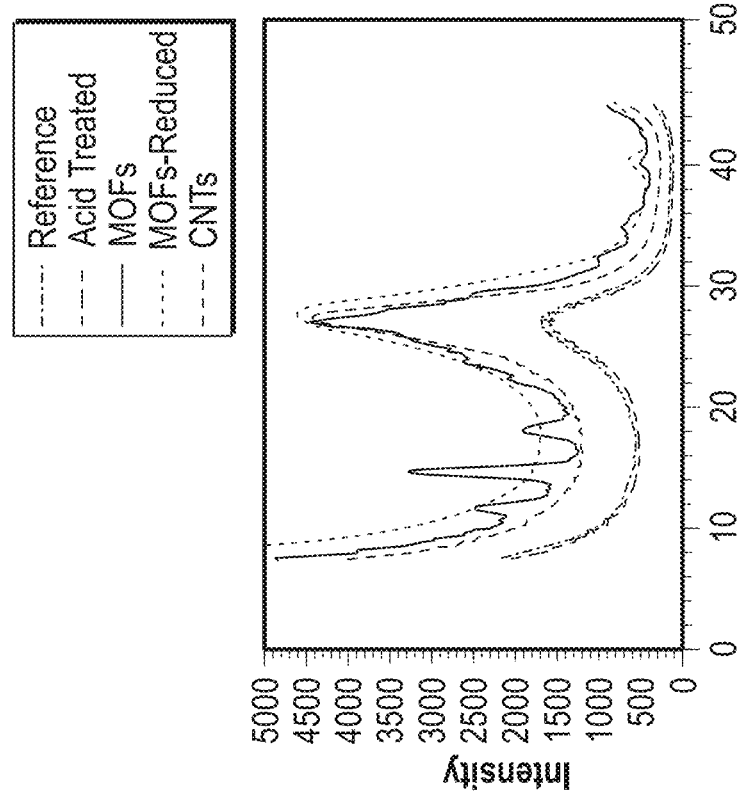
FIG. 8 illustrates a graph of WAXD profiles of carbon fiber samples after different surface treatments.

FIG. 8 illustrates a graph of WAXD profiles of carbon fiber fibers after different surface treatments. As shown in FIG. 8, PAN fibers can display a turbostratic carbon peak. The turbostratic carbon peak beyond 2θ=25° can be typical for turbostratic fibers and it appears in all samples as the fibers serve as a substrate for the different coatings.

The samples (e.g., 402 or 408) can have a different scattering pattern with many crystalline peaks can emerge. The different scattering pattern can posses a large unit cell because its scattering peaks do not match those of the Ni (111) crystallographic plane of NiO (200) and (111) planes. When reduced at 550° C. under intert environment, the samples (402 or 408) can lose several of these peaks and shows a noticeable peak at 2θ=39°. The peak of 2θ=39° of the MOF 100 can be indicative of the NiO (111) plane. The sample 502 can display a maximum peak at 26.2° that can correspond to a wall-to-wall periodicity in multiple wall CNTs. The maximum peak of the samples (10 or 12) can be a characteristic of the (002) reflection from the graphitic layer.

The WAXS patterns and graphs shown in FIG. 7E and 8 confirm that the sample 502 can be multiwalled CNT's because a single wall CAT comprises a single graphitic layer. In contrast, to a single wall CNT, the diffraction shown in FIGS. 7E and 8 of the sample 502 can indicate that multiple planes of graphitic layers are present. Interspacing between the graphitic shells can be computed from:

$$d = \frac{2\pi}{q\mathrm{max}} = 3.4 Å° \qquad [1]$$

where the scattering vector is given by:

$$q = 4\pi \sin\left(\frac{2\theta}{\lambda}\right) \qquad [2]$$

where λ is wavelength.

Figure 9:
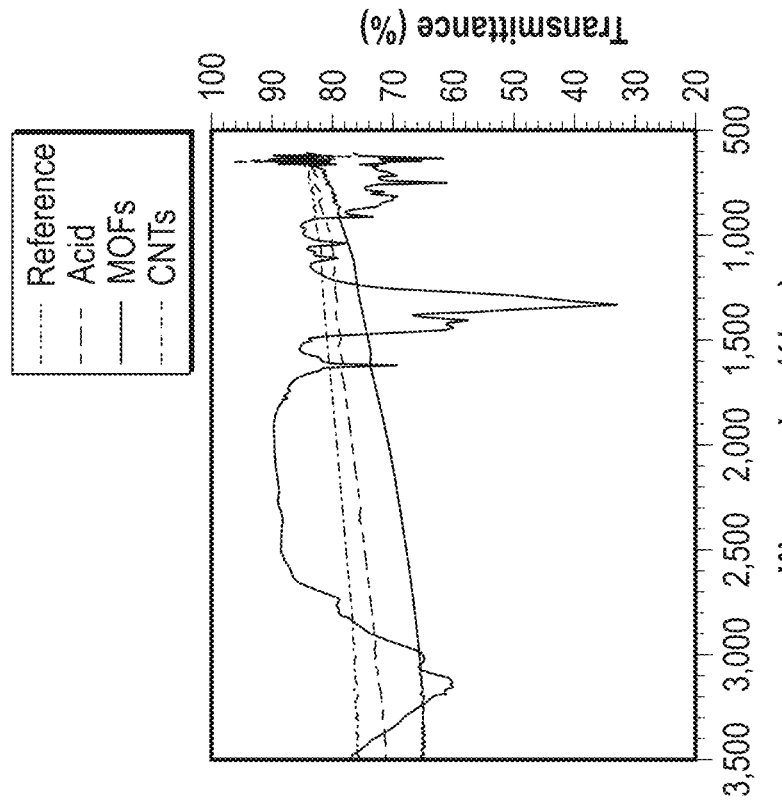
FIG. 9 illustrates a graph of Fourier-transform infrared (FTIR) Spectra of carbon fiber samples after different surface treatments.
Figure 10:
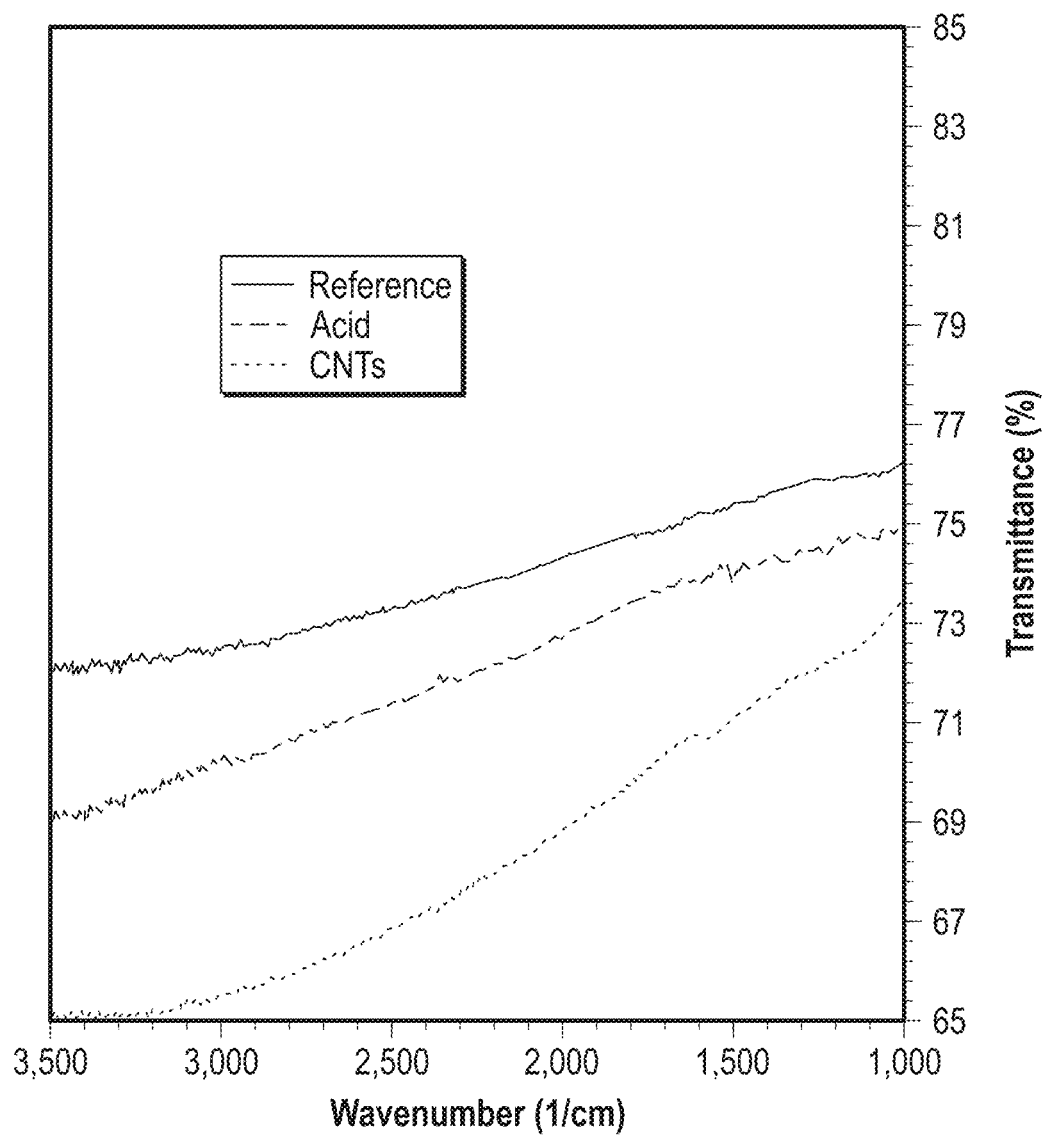
FIG. 10 illustrates a zoomed-in graph of the Spectra of carbon fibers without a MOF.

FIG. 9 illustrates a graph of FUR Spectra of the carbon fiber 200 after different surface treatments. FIG. 10 illustrates a zoomed-in graph of the Spectra of the carbon fiber 200 without MOF 100. FIGS. 9 and 10 will be discussed together below.

As shown in FIGS. 9 and 10, the reference sample of carbon fiber 390 does not show discernible or typical peaks due to the lack of any functional groups. The acid-treated carbon fiber sample 400 can show new peaks. For example, the acid-treated carbon fiber sample 400 can have groups C—O—C, C—O—N, or C—N that can appear between 1400 cm$^{-1}$ and 1000 cm$^{-1}$. As shown in FIGS. 9 and 10, these peaks for the acid-treated carbon fiber sample 400 can be stronger than peaks of the reference sample of carbon fiber 390. These stronger peaks for the acid-treated carbon fiber sample 400 can indicate that oxygen functional groups were introduced through oxidation by the nitric acid. The peaks between 3200 and 3500 cm$^{-1}$ can be associated with OH group stretching vibrations, which can indicate water presence due to insufficient drying of the carbon fiber 200.

FIGS. 9 and 10 can also indicate that the MOF 100 were successfully deposited onto the carbon fiber 200 for the sample 500 because the sample 500 can have many peaks that are not present in other surface treatments of the carbon fiber 200. A first peak around 3400 cm$^{-1}$ can be caused by the O—H group coupling to Ni(ii). A second group of peaks at around 1590 cm$^{-1}$ and 1390 cm$^{-1}$ can be associated with a stretching of coordinated carboxylate (—COO$^-$) and symmetric stretching mode of coordinated carboxylate, respectively. A third group of peaks, between 7500-800 cm$^{-1}$ can ascribe to the O—Ni—O vibrations while thus around 1050 and 850 cm$^{-1}$ can confirm the C—N and C—H bonds, respectively.

Figure 11A:
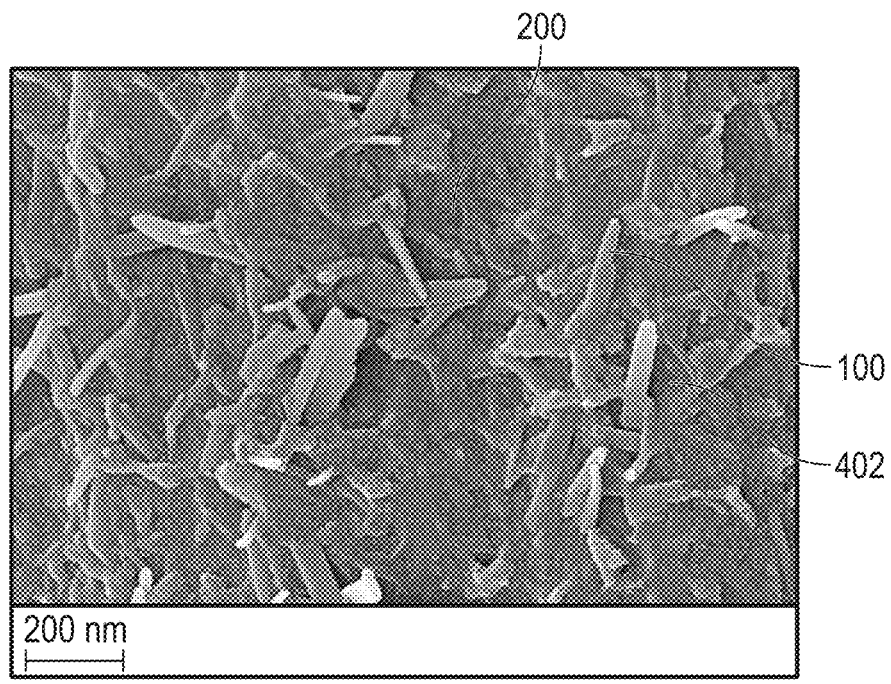
FIG. 11A illustrates scanning transmission electron microscopy (STEM) micrographs of a carbon fiber sample with MOFs.
Figure 11B:
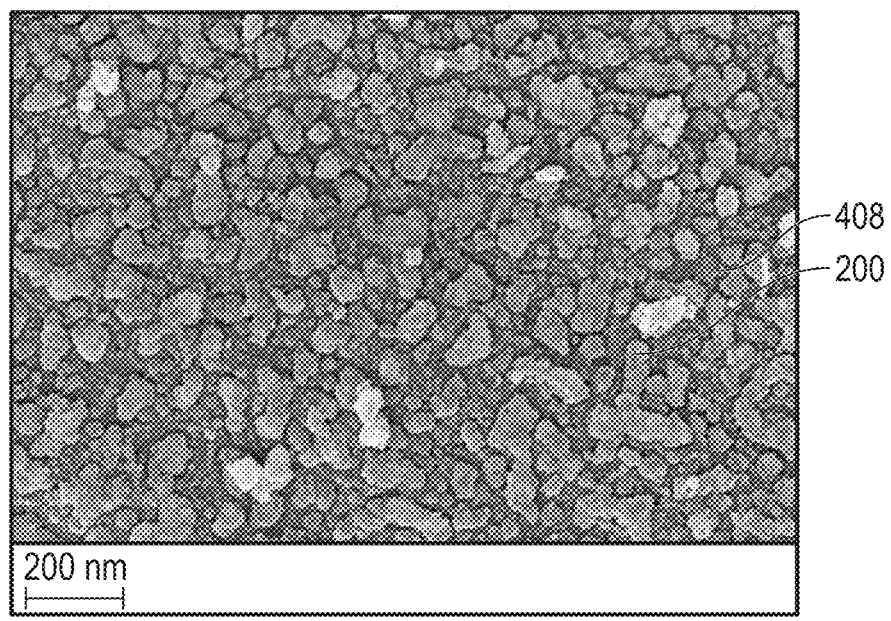
FIG. 11B illustrates STEM micrographs of a carbon fiber sample with MOFs.

FIG. 11A illustrates STEM micrographs of the MOF coated carbon fiber sample 402. FIG. 11B illustrates STEM micrographs of the reduced MOF carbon fiber sample 408 after reduction under Nitrogen. FIGS. 11A and 11B will be discussed together below.

The pre-reduction morphology of the MOF coated carbon fiber sample 402 shown in FIG. 11A, shows that the carbon fiber 200 can have interwoven flakes of the MOF 100. The interwoven flakes of the MOF 100 can result in the thin sheet walls 406 (FIG. 4C). The reduced-MOF carbon fiber sample 408, shown in FIG. 11B, shows that the reduced MOF carbon fiber sample 408 can have particulate shapes with broad particle size distribution. The larger particles morphology of the carbon fiber 200, as shown in FIG. 11B, can suggest that the reduced MOF 100 of the carbon fiber 200 can suggest that the carbon fiber 200 can comprise agglomerates of much smaller particles.

STEM-EDS mode can be used to find the composition of the MOF coated carbon fiber sample 402 and the reduced-MOF carbon fiber sample 408.

TABLE 1

| Element | MOF post reduction (%) | | | | Element | MOF pre reduction (%) | | | |
| --- | --- | --- | --- | --- | --- | --- | --- | --- | --- |
| | C | N | O | Ni | | C | N | O | Ni |
| Average | 73.08 | 2.64 | 4.35 | 19.93 | Average | 80.26 | 3.35 | 5.05 | 11.33 |
| St. Deviation | 4.54 | 0.33 | 0.38 | 5.14 | St. Deviation | 5.68 | 1.43 | 2.05 | 2.64 |

As shown in Table 1, reducing the MOF-coated carbon fiber sample 402 to the reduced-MOF carbon fiber sample 408 can decrease the carbon content. The reduction in carbon content in the reduced-MOF carbon fiber sample 408 can be caused by partial decomposition of the MOF 100 (FIG. 1) in the reduced-MOF carbon fiber sample 408. As also shown in Table 1, reducing the MOF coated carbon fiber sample 402 to the reduced-MOF carbon fiber sample 408 can decrease the oxygen content and increase the nickel content. The reduction of oxygen and increase in nickel can suggest the removal of oxides in making the reduced-MOF carbon fiber sample 408. Thus, because the removal of oxides is preferable to aid in the catalytic growth of CNTs, the reduced-MOF carbon fiber sample 408 can be better suited for catalytic growth of CNTs.

Figure 12A:
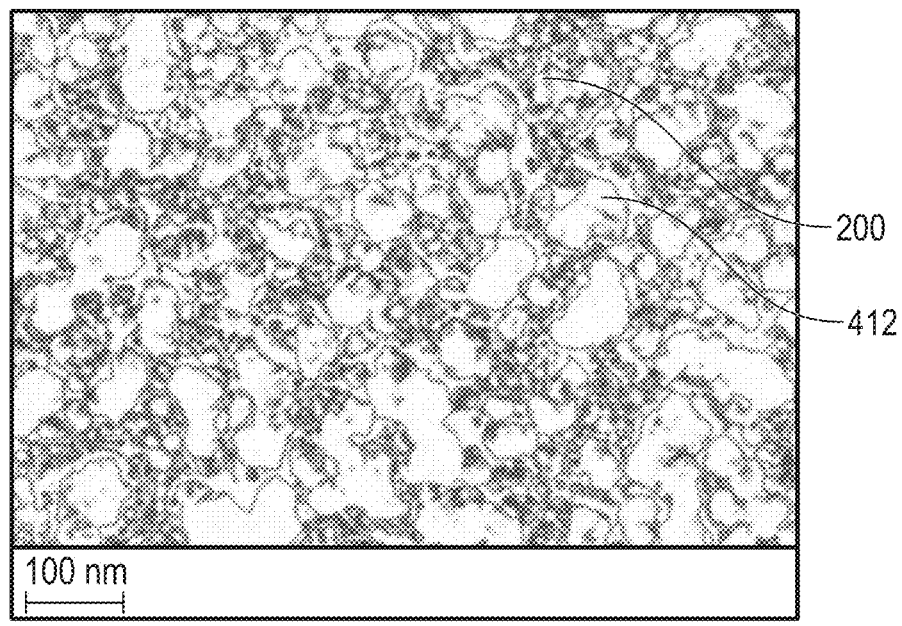
FIG. 12A illustrates an Image-J® digitized of a STEM micrograph.
Figure 12B:
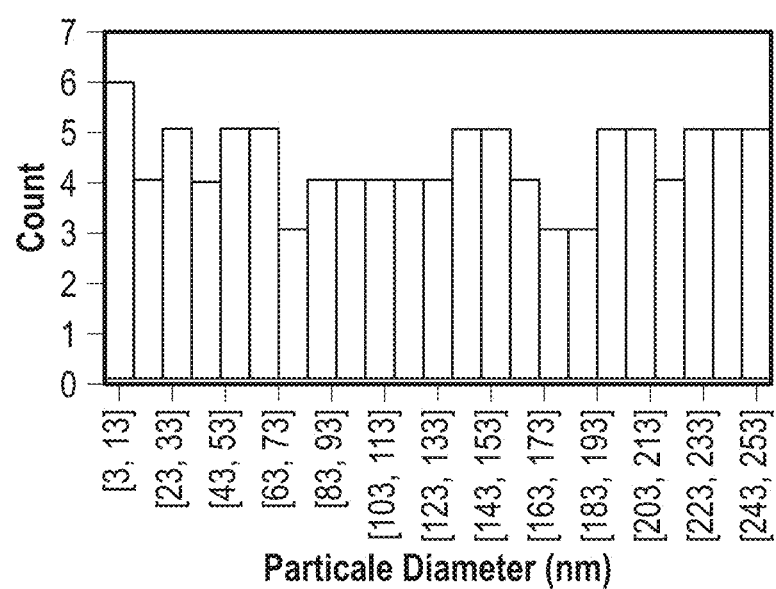
FIG. 12B illustrates a graph of the particle size distribution for the carbon fiber of FIG. 12A.

FIGS. 12A and 12B will be discussed below concurrently. FIG. 12A illustrates an Image-J® digitized STEM micrograph of the carbon fiber sample with CNTs 412. FIG. 12B illustrates a graph of the particle size distribution for the carbon fiber 200 of the carbon fiber sample with CNTs 412 of FIG. 12A. As shown in FIGS. 12A and 12B, the carbon fiber 200 of the carbon fiber sample with CNTs 412 can have no dominant size of the reduced particles. The particles of the carbon fiber 200 of the carbon fiber sample with CNTs 412 can range from a few nm to almost 250 nm. Such a wide range of particle sizes can lead to different CNTs, or even carbon nanofibers, diameters.

FIG. 13A illustrates a water meniscus around the reference sample of carbon fiber 390. FIG. 13B illustrates a water meniscus around the acid-treated carbon fiber sample 400. FIG. 13C illustrates a water meniscus around the reduced MOF coated carbon fiber sample 408. FIG. 13D illustrates a water meniscus around the carbon fiber sample with CNTs 412, FIGS. 13A-13D will be discussed together below.

FIGS. 13A-13D compare a water meniscus on a surface of the carbon fiber 200 with different surface treatments. Each of FIGS. 13A-13D, can be representative of a sample 100 seconds after a sample contacts water. The meniscus values shown in FIG. 13A-13D can be considered qualitatively as the sample geometry was changing with time due to capillary induced densification of the samples, which can be visible specially in the reference samples. Loose fibers in the samples aggregates can be due to capillary effect during the immersion in water. However, as shown in FIG. 13C, the reduced MOF coated carbon fiber sample 408 can retain almost a constant diameter throughout the immersion process while the other three configurations can exhibit necking in the diameter. As shown in FIG. 13D, the carbon fiber sample with CNTs 412 can have the largest diameter due to an added thickness of the CNTs coating and due to nanoscale gaps between the CNTs, which can minimize the water capillary effect.

Figure 14:
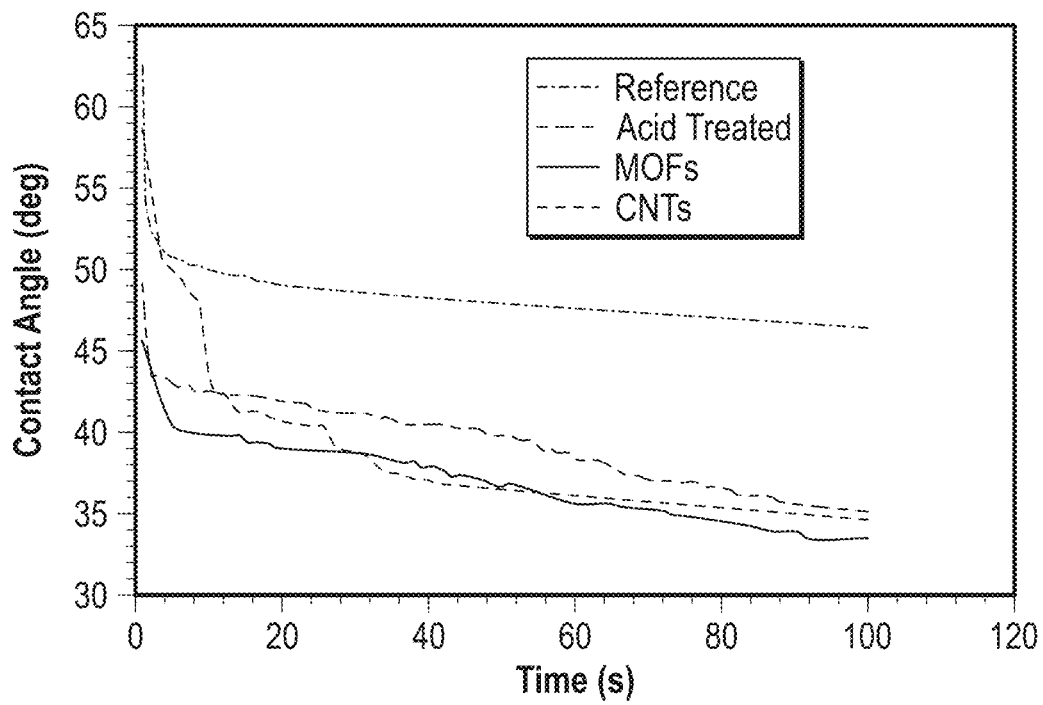
FIG. 14 illustrates a graph of water contact angle vs. time for different carbon fiber samples.

FIG. 14 illustrates a graph of water contact angle vs. time for different samples of the carbon fiber 200. Each of the samples shown in FIG. 14 can show quasi-instantaneous meniscus forms evident by a drop of a contact angle from 90° to anywhere between 65° and 45°. The reduced MOF coated carbon fiber sample 408 can have the greatest drop. The bend of each curve in FIG. 14 can show an amount of time for water to completely fill each sample. The reference sample of carbon fiber 390 can have the shortest amount of time to completely fill with water, and the acid-treated carbon fiber sample 400 can have the second shortest amount of time to completely fill with water. Each of the reduced MOF coated carbon fiber sample 408 and the carbon fiber sample with CNTs 412 can take much longer to fill with water. The delay in filling with water in the reduced MOF coated carbon fiber sample 408 and the carbon fiber sample with CNTs 412 can be because the water needs to force the air out of the porous structures of the samples. This multiscale capillary effect of the reduced MOF coated carbon fiber sample 408 and the carbon fiber sample with CNTs 412 can explain the increased time needed to fill the samples with water. After the water replaces the air within a sample, the contact angle can attain its static value. The reference sample of the carbon fiber 390 can have a contact angle of 46.31°. The acid-treated carbon fiber sample 400 can have a contact angle of 35.07°. The reduced MOF coated carbon fiber sample 408 can have a contact angle of 33.43°. The carbon fiber sample with CNTs 412 can have a contact angle of 34.52°.

Figure 15:
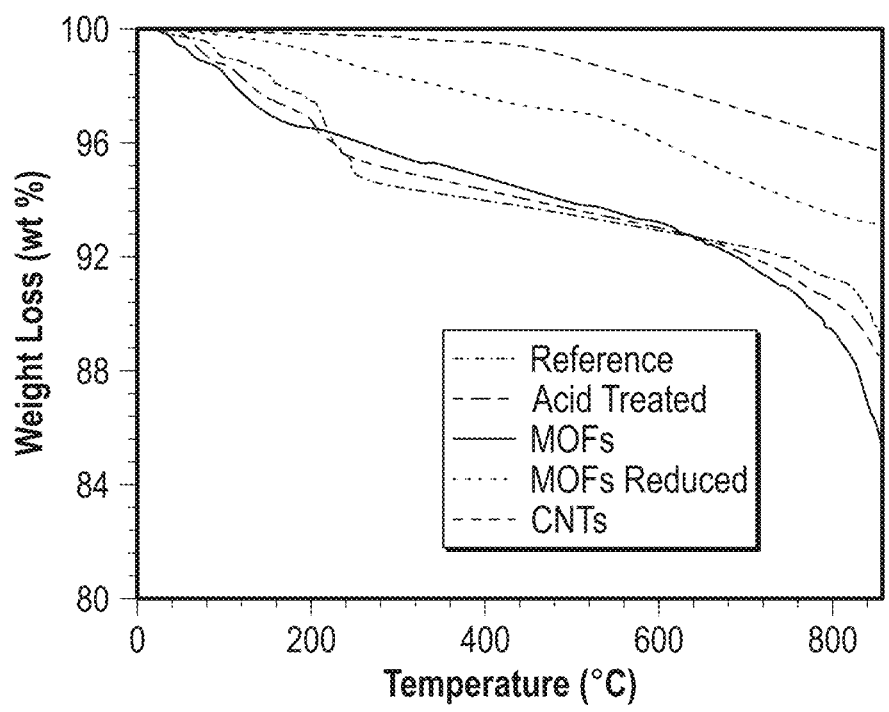
FIG. 15 illustrates a graph of Thermogravimetric analysis (TGA) curves of different carbon fiber configurations.

FIG. 15 illustrates a graph of TGA curves of different configurations of the carbon fiber 200. TGA curves can show a thermal stability of different samples of the carbon fiber 200 with different surface treatments. As shown in FIG. 15, the reference sample of the carbon fiber 390 can attain a 10-percent weight loss of the original weight in a nitrogen environment. In the reference sample of the carbon fiber 390, the lack of a sizing agent or other surface coatings can lead to fast and significant degradation.

The reduced MOF coated carbon fiber sample 408 can display the fastest degradation rate up to 225° C., which can be likely due to insufficient drying as the samples were soaked separately in water during acid-treatment and in methanol during the growth of the MOF 100. Thus, the reduced MOF coated carbon fiber sample 408 was likely exposed to more moisture than any of the other samples. For the reduced MOF coated carbon fiber sample 408, the degradation of the sample past 22.5° C. can slow down as compared to the acid-treated carbon fiber sample 400 and the reference sample of carbon fiber 390. At about 650° C. the degradation of the reduced MOF coated carbon fiber sample 408 can increase. The increase in the degradation of the reduced MOF coated carbon fiber sample 408 can suggest that the sample is decomposing.

The carbon fiber sample with CNTs 412 can have the lowest degradation of all of the samples. The carbon fiber sample with CNTs 412 can have a good graphitization structure which can result in less temperature degradation.

Figure 16A:
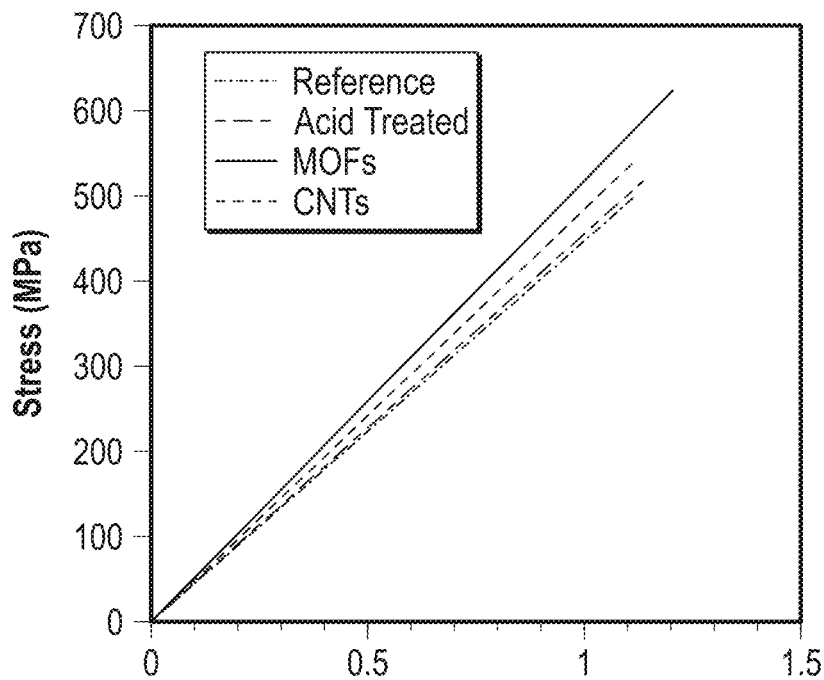
FIG. 16A illustrates a graph of tensile tests of different carbon fiber samples having different surface treatments.
Figure 16B:
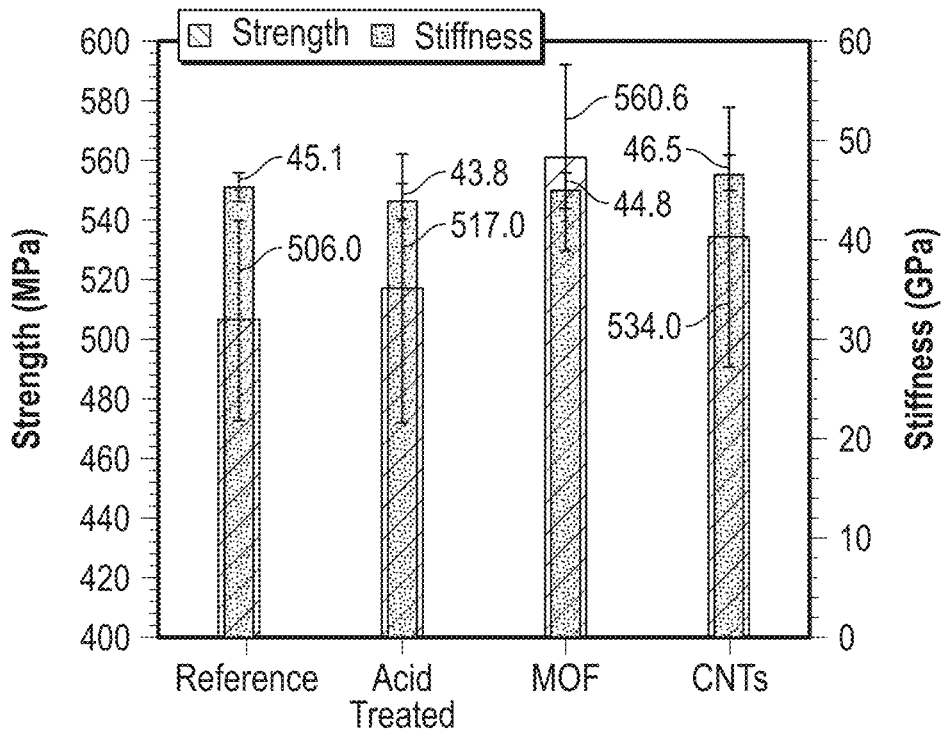
FIG. 16B illustrates a graph of average tensile strength and axial stiffness of different carbon samples with different surface treatments.

FIG. 16A illustrates a graph of tensile tests of different carbon fiber samples with different surface treatments. FIG. 16B illustrates a graph of average tensile strength and axial stiffness of different carbon samples with different surface treatments. FIGS. 16A and 16B will be discussed together below.

As shown in FIGS. 16A and 16B, all of the samples can exhibit linear elastic behavior and the stiffness for all of the samples remained almost unaltered by the surface treatments. The stiffness remained the same for all of the samples because stiffness can be a volumetric property that can depend on the core of the fiber, rather than the surface of the fiber.

The carbon fiber sample with CNTs 412 can have a slight improvement on the stiffness as compared to other samples. The improvements of stiffness of the carbon fiber sample with CNTs 412 can likely be due to annealing at elevated temperatures which can sinter the MOF 100 under the CNTs, which can lead to a stiffer phase.

The acid-treated carbon fiber sample 400 can have a slight increase of strength (2.1%) when compared to the reference sample of carbon fiber 390. The small increase in strength of the acid-treated carbon fiber sample 400 can likely be attributed to the relatively low acid concentration acid (30%) used to prepare the samples. The low acid concentration acid was used to help control density of MOF 100 growth in samples. In some examples, the acid etching of the acid-treated carbon fiber sample 400 can cause damage to fibers of the carbon fiber 200, which can result in a decrease in strength of a sample.

The MOF coated carbon fiber sample 402 can increase the strength by 11% as compared to the reference sample of carbon fiber 390. The MOF 100 on the surface of the carbon fiber 200 on the MOF coated carbon fiber sample 402 can increase the surface area and provide anchoring between the fiber and the matrix. Defects induced by acid-etching can be filled with the MOF 100, as the —COOH grouped induced by the acid etching and the ligand (e.g., organic ligand 102) in the MOF 100 can play a role in anchoring the NI-MOF structure to the activated sites on the surface of the carbon fiber 200. The MOF 100 can assist in better load transition from the matrix to the fiber, and better load distribution on the fiber surface. The better load transition from matrix to fiber and better load distribution on the fiber surface can increase the load-bearing capacity of the sample, which can result in enhanced strength.

The carbon fiber sample with CNTs 412 can improve the strength by 5.5% when compared to the reference sample of carbon fiber 390. The elevated temperature needed to grow the CNTs can induce some damage to the carbon fiber 200. This damage to the carbon fiber 200 can be in addition to the damage caused by the acid-etching of the carbon fiber 200. Growing fibers on the surface of the carbon fiber 200 can lead to modest strength improvements. The dense blanket of CNTs can hinder the flow of the epoxy from reaching the underlying carbon fiber, which can be limit the quality of adhesion. Having the MOE 100 on the surface of the carbon fiber 200 beneath the CNTs can help improve the flow of epoxy and can help improve the strength of a sample.

Figure 17B:
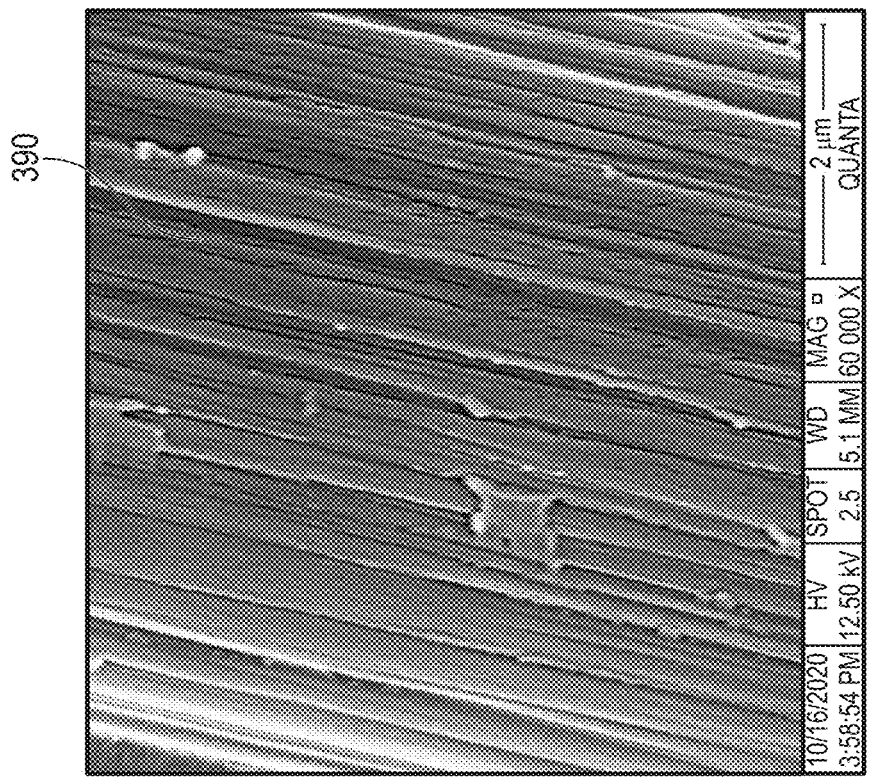
FIG. 17B illustrates micrographs of the fracture surfaces for a reference sample.
Figure 17A:
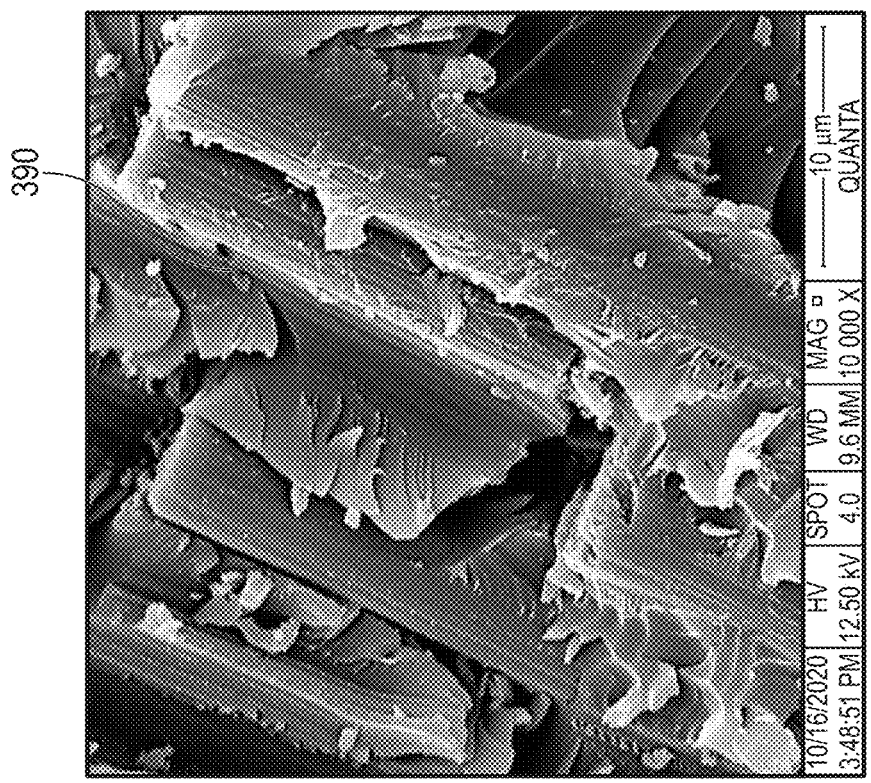
FIG. 17A illustrates micrographs of the fracture surfaces for a reference sample.

FIG. 17A illustrates micrographs of the fracture surfaces for a reference sample of carbon fiber 390. FIG. 17B illustrates micrographs of the fracture surfaces for a reference sample of carbon fiber 390. FIGS. 17A and 17B will be discussed together.

As seen in FIGS. 17A and 17B, the fracture of the composite can be dictated by fiber breakage. The fiber breakage was likely caused by the absence of a strong interface between the fiber and the matrix in the reference sample of carbon fiber 390. This fiber breakage can be shown by the clean fiber surface in FIG. 17B. The fiber breakage can lead to an unstoppable crack propagating across the carbon fiber 200.

Figure 17D:
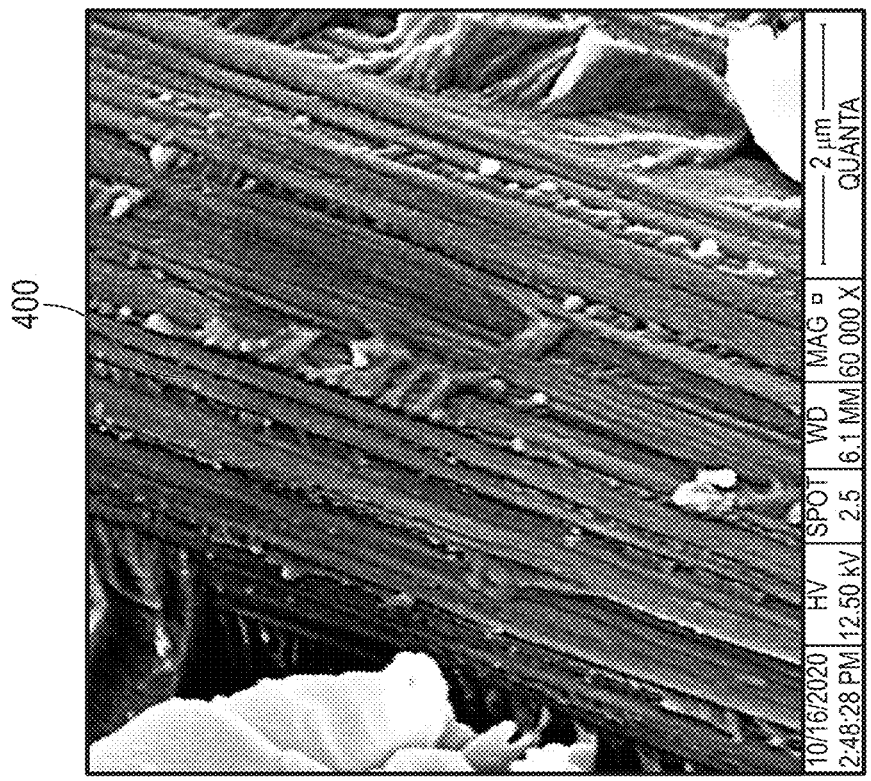
FIG. 17D illustrates micrographs of the fracture surfaces for an acid-treated sample.
Figure 17C:
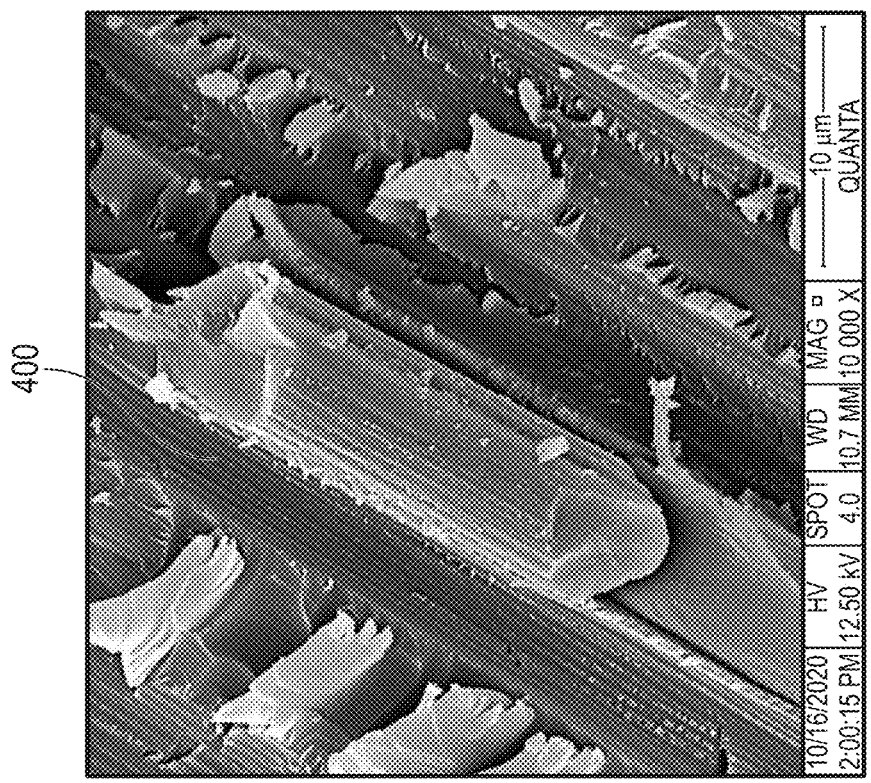
FIG. 17C illustrates micrographs of the fracture surfaces for an acid-treated sample.

FIG. 17C illustrates micrographs of the fracture surfaces for the acid-treated carbon fiber sample 400. FIG. 17D illustrates micrographs of the fracture surfaces for the acid-treated carbon fiber sample 400. FIGS. 17C and 17D will be discussed together.

As shown in FIGS. 17C and 17D, activating the surface of the carbon fiber 200 in the acid-treated carbon fiber sample 400 did not alter the pattern of fiber failure. However, as shown in FIGS. 17C and 17D, the surface of the carbon fiber 200 in the acid-treated carbon fiber sample 400 can improve the adhesion between layers of the carbon fiber 200, which can be shown by the residue of the epoxy on the surface of the carbon fiber 200.

Figure 18B:
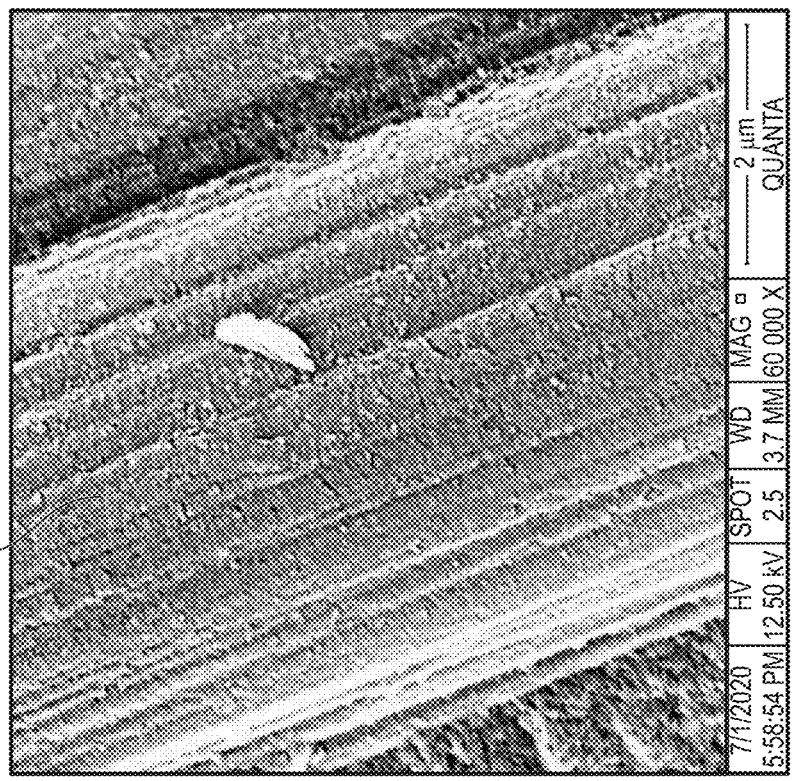
FIG. 18B illustrates micrographs of the fracture surfaces for a MOF carbon fiber sample.
Figure 18A:
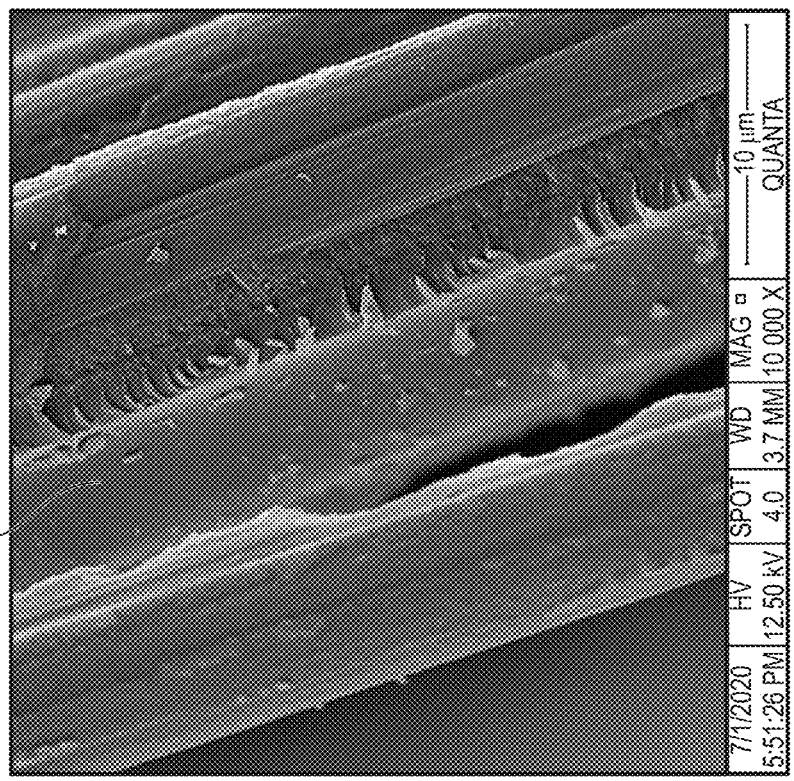
FIG. 18A illustrates micrographs of the fracture surfaces for a MOF fiber sample.

FIG. 18A illustrates micrographs of the fracture surfaces for the reduced MOF coated carbon fiber sample 408. FIG. 18B illustrates micrographs of the fracture surfaces for the reduced MOF coated carbon fiber sample 408. FIGS. 18A and 18B will be discussed together.

As shown in FIGS. 18A and 18B, the MOF 100 on the reduced MOF coated carbon fiber sample 408 can act as crack deterrents or retardants. Cracks that initiate in the matrix can get deflected along the axis of the carbon fiber 200 on a wavy trajectory as shown in FIG. 18A The MOF 100 (FIG. 1) of the MOF coated carbon fiber sample 402 can stay intact through the failure as shown in FIG. 18B.

Figure 18D:
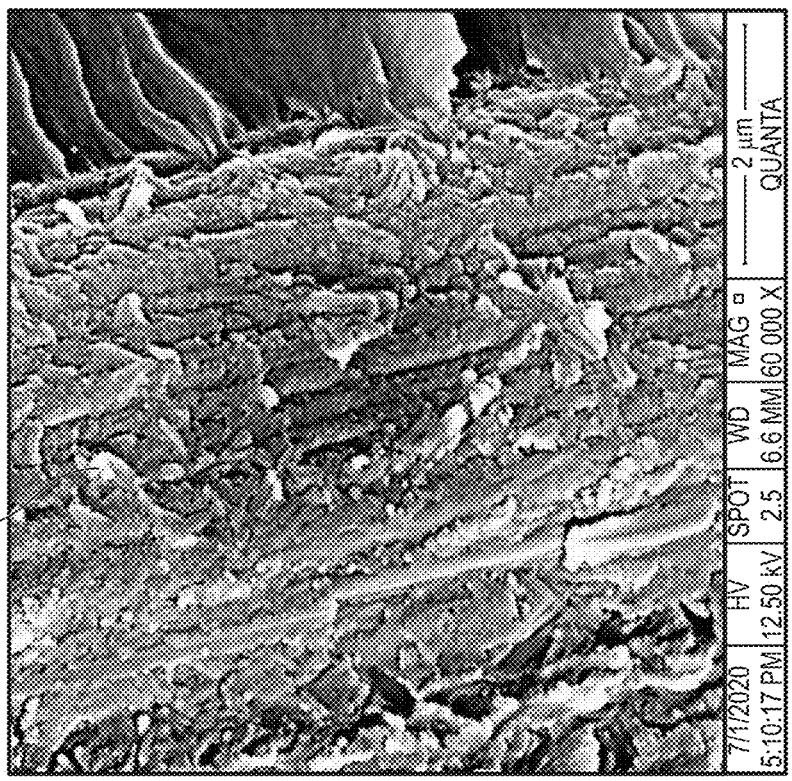
FIG. 18D illustrates micrographs of the fracture surfaces for a carbon fiber sample with CNTs.
Figure 18C:
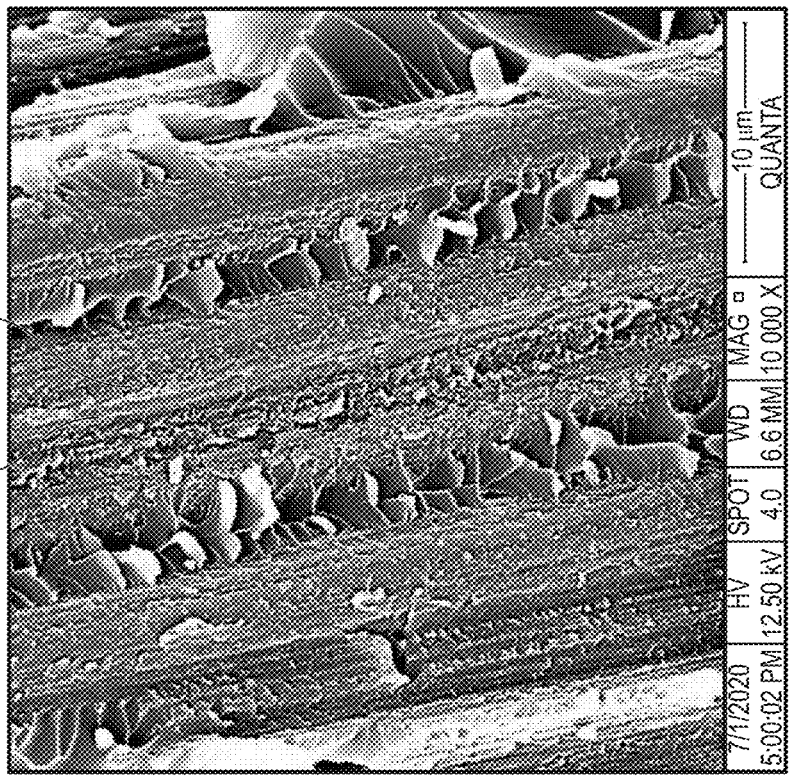
FIG. 18C illustrates micrographs of the fracture surfaces for a carbon fiber sample with CNTs.

FIG. 18C illustrates micrographs of the fracture surfaces for the carbon fiber sample with CNTs 412. FIG. 18D illustrates micrographs of the fracture surfaces for the carbon fiber sample with CNTs 412. FIGS. 18C and 18D will be discussed together.

As shown in FIGS. 18C and 18D, the CNTs on the surface of the carbon fiber 200 of the carbon fiber sample with CNTs 412 can hinder crack propagation along the fiber axis and the matrix in between. As shown, adjacent fibers can sometimes no undergo longitudinal cracks as well. The rough surfaces shown in FIG. 18D, can indicate good adhesion between the fibers and the matrix.

For both the reduced MOF coated carbon fiber sample 408 and the carbon fiber 200 of the carbon fiber sample with CNTs 412 the samples can have little or no cracks between the fibers. The patterned structure of the MOF 100 (FIG. 1) and the formation of CNTs can promote mechanical interlocking between the nano reinforcement species and the epoxy matrix. The mechanical interlocking between the nano reinforcement species and the epoxy matrix can constitute strong impediments to crack propagation and can increase the strength of the samples.

Figure 19:
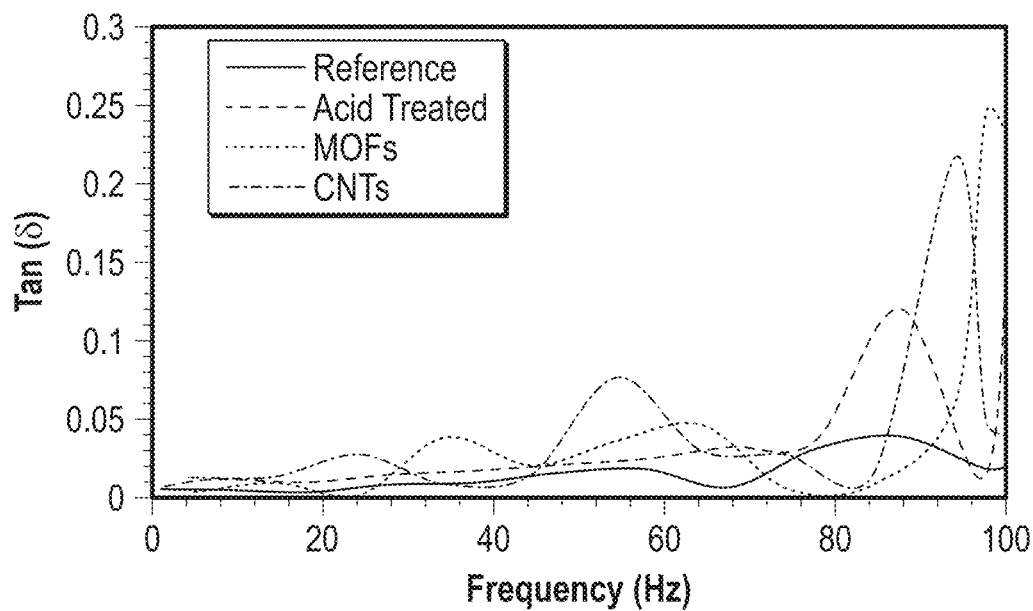
FIG. 19 illustrates a graph of a dynamic mechanical analysis (DMA) measurement of the damping parameter; tan (δ) for different samples with different surface treatments via frequency sweep at room temperature.

FIG. 19 illustrates a graph of a DMA measurement of the damping parameter; tan (δ) for different samples with different surface treatments via frequency sweep at room temperature.

Interfacial bonding, stick-slip friction, and nanofillers are different mechanisms that can affect the damping capacity of carbon-fiber-reinforced composites. As shown in FIG. 19, the reference sample of carbon fiber 390 can have the lowest damping parameter. The acid-treated carbon fiber sample 400 can show as much as 200% at 87 Hz improvement as compared to the reference sample of carbon fiber 390. The acid-treated carbon fiber sample 400 likely has this improvement because the acid-etching can enhance the surface area of the carbon fiber 200, which can allow for larger contact with the epoxy.

The addition of MOT 100 to the carbon fiber 200 in the MOF coated carbon fiber sample 402 can increase the surface area even more, and the weak epoxy-metal interfacial bonding can allow for more energy dissipation. Thus, for the MOF coated carbon fiber sample 402, the damping parameter can be increased as high as 500% as compared to the reference sample of carbon fiber 390.

The growth of CNTs on the carbon fiber sample with CNTs 412 can increase the surface area tremendously because of the high aspect ratio of the CNTs. This increased surface area can result in significant friction between the CNTs and the epoxy, which can lead to significant energy dissipation. The carbon fiber sample with CNTs 412 can attain an improvement of the damping coefficient by up to 425% as compared to the reference sample of carbon fiber 390.

Figure 20:
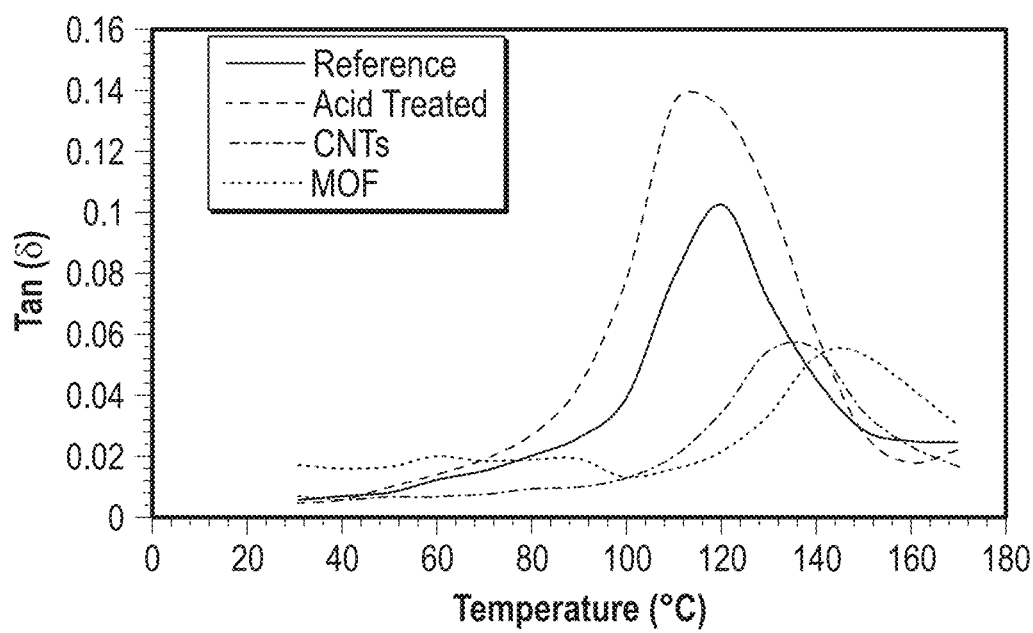
FIG. 20 illustrates a graph of a DMA measurement of a temperature sweep for different samples with different surface treatments.

FIG. 20 illustrates a graph of a DMA measurement of a temperature sweep for different samples with different surface treatments.

DMA measurements can also elucidate how different surface treatments of the carbon fiber 200 can affect the glass transition temperature $T_g$, of the carbon fiber reinforced composites. The glass transition temperature, $T_g$, can be measured at the peak of tan (δ) curve. As shown in FIG. 20, the reference sample of carbon fiber 390 can have a glass transition temperature, $T_g$, of about 120°. The acid-treated carbon fiber sample 400 can show no significant change of a glass transition temperature, $T_g$, when compared to the reference sample of carbon fiber 390. The reduced MOF coated carbon fiber sample 408 can have an elevated glass transition temperature, as compared to the reference sample of carbon fiber 390, of 140° C. The carbon fiber sample with CNTs 412 can have an even higher glass transition temperature, $T_g$, of 150° C. Because the reduced MOF coated carbon fiber sample 408 and the carbon fiber sample with CNTs 412 have an increased glass transition temperature, $T_g$, the interface embodied by a new phase between the fiber and matrix can play a role in a shift of the glass transition temperature, $T_g$. During a glass transition, epoxy molecular chains can absorb thermal energy and start moving. However, having the MOF 100 or CNTs on the surface of the carbon fiber 200 (e.g., the reduced MOF coated carbon fiber sample 408 and the carbon fiber sample with CNTs 412) can slow down the movement relating to the glass transition. Thus, more energy (e.g., temperature) can be necessary to overcome these nanoscale hurdles caused by the MOF 100 and CNTs on the carbon fiber 200. The measurement of glass transition temperature, $T_g$, can offer a venue to, qualitatively, prove the effects of fiber surface treatment on the mechanical performance of epoxy-based composites.

Figure 21:
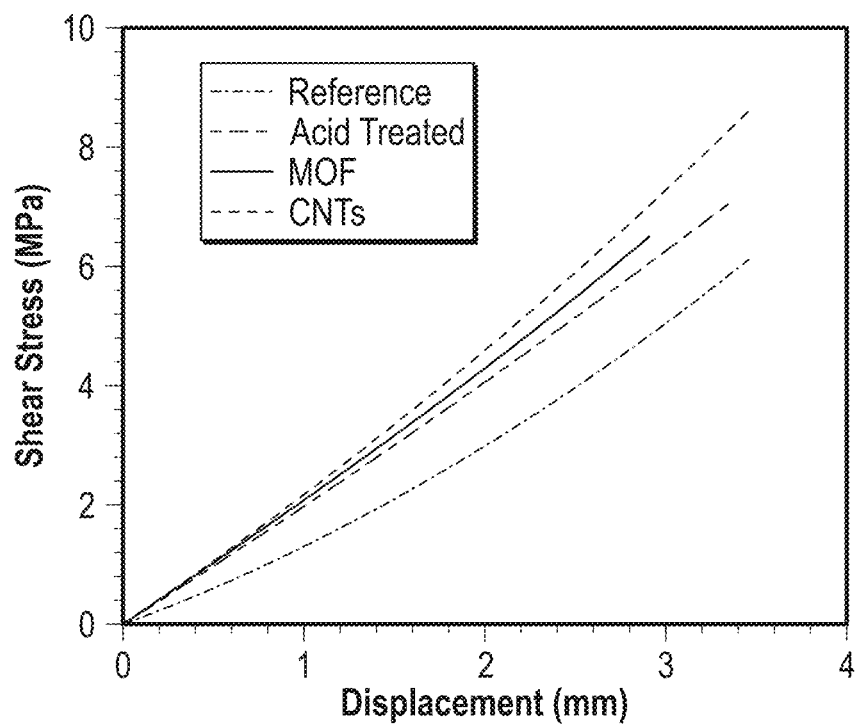
FIG. 21 illustrates a graph of shear lap joint stress vs. displacement for samples with different surface treatments.

FIG. 21 illustrates a graph of shear lap joint stress vs. displacement for samples with different surface treatments.

Figure 22:
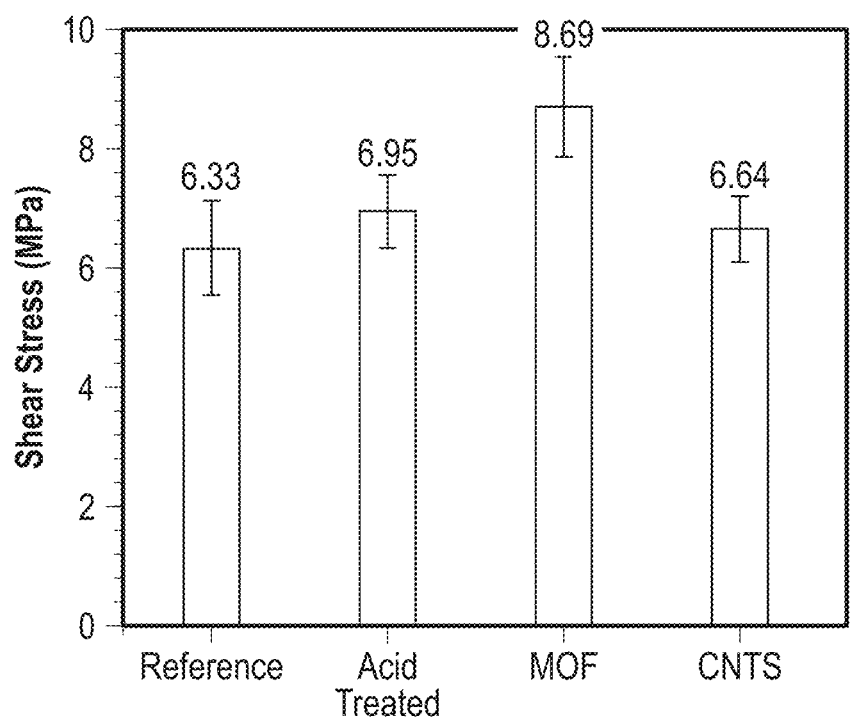
FIG. 22 illustrates a graph of shear strength for samples with different surface treatments.

FIG. 22 illustrates a graph of shear strength for samples with different surface treatments. FIGS. 21 and 22 will be discussed below.

The reference sample of carbon fiber 390 can have the lowest joint shear strength. The acid-treated carbon fiber sample 400 can have a shear strength that is 10% higher than that of the reference sample of carbon fiber 390. The enhanced surface roughness of the acid-treated carbon fiber sample 400 can increase the shear strength of the acid-treated carbon fiber sample 400.

The MOF coated carbon fiber sample 402 can have a joint shear strength that is 40% higher than the reference sample of carbon fiber 390. The nanosheet structures of the MOF coated carbon fiber sample 402 can furnish an extended contact area and a mechanical interlocking of epoxy between the pores of the MOF coated carbon fiber sample 402 can be responsible for the increased joint shear strength.

The carbon fiber sample with CNTs 412 can improve the shear strength by 4.4% as compared to the reference sample of carbon fiber 390. The minute increase in strength can indicate that the epoxy did not wet the CNTs, which is likely due to the density of the CNTs in the carbon fiber sample with CNTs 412.

Figure 23D:
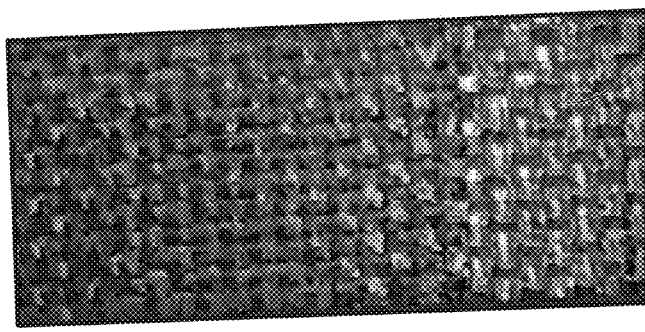
FIG. 23D illustrates representative images of different joint failure modes for a carbon fiber sample with CNTs.
Figure 23C:
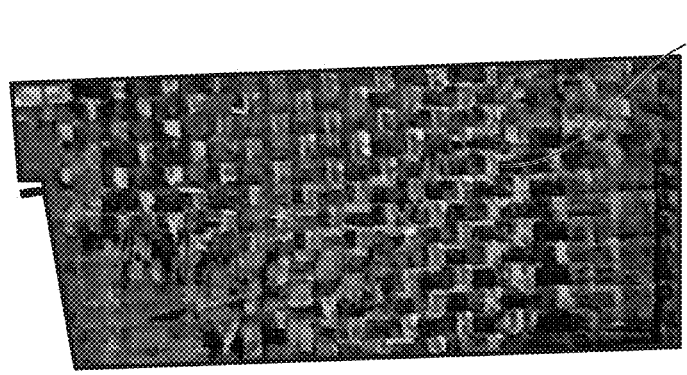
FIG. 23C illustrates representative images of different joint failure modes for a MOF carbon fiber sample.
Figure 23B:
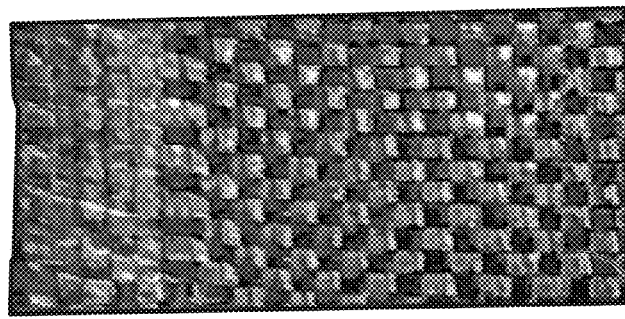
FIG. 23B illustrates representative images of different joint failure modes for an acid-washed sample of carbon fiber.
Figure 23A:
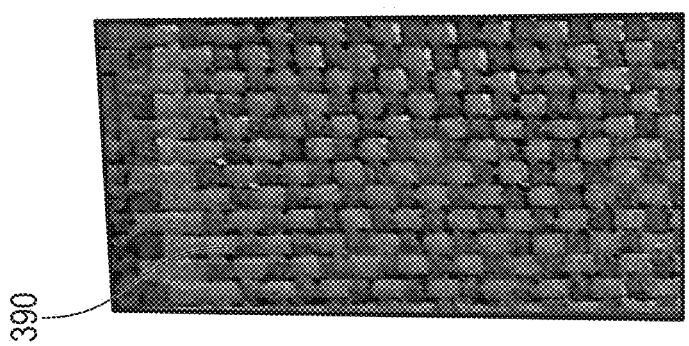
FIG. 23A illustrates representative images of different joint failure modes for a reference sample of carbon fiber.

FIGS. 23A-23D will be discussed together. FIG. 23A illustrates representative images of different joint failure modes observed for the reference sample of carbon fiber 390. FIG. 23B illustrates representative images of different joint failure modes observed for the acid-washed sample of carbon fiber 400. FIG. 23C illustrates representative images of different joint failure modes observed for the MOF carbon fiber sample 408. FIG. 23D illustrates representative images of different joint failure modes observed for the carbon fiber sample with CNTs 412.

As shown in FIG. 23A, the reference sample of carbon fiber 390 can have a stock-break failure (e.g., the sample broke outside the joint area). As shown in FIG. 23B, the acid-treated carbon fiber sample 400 can experience a cohesive failure. The cohesive failure can be evidenced by the adhesive residue left behind on both parts of the acid-treated carbon fiber sample 400 one of which is shown in FIG. 23B). The surface functionality of the acid-treated carbon fiber sample 400 can be responsible for improvements in shear strength.

As shown in FIG. 23C, the MOF coated carbon fiber sample 408 can have a fiber-tear failure. The fiber-tear failure can be indicative of the reinforced fiber on both ruptured surfaces. The tearing of the fiber can be indicative of significant shear bearing capability. As shown in FIG. 23D, the carbon fiber sample with CNTs 412 can show that the epoxy did not wet the CNTs well, which can be due to the density of the CNTs. Thus, there can be a thin-layer cohesive failure, leaving some adhesive dusting on one of the joint surface, and a thicker adhesive dusting on the other joint surface.

NOTES AND EXAMPLES

The following, non-limiting examples, detail certain aspects of the present subject matter to solve the challenges and provide the benefits discussed herein, among others.

Example 1 is a reinforced carbon composite comprising: a carbon substrate; and a metal organic framework bonded to the carbon substrate.

In Example 2, the subject matter of Example 1 optionally includes wherein the carbon substrate comprises carbon nanotubes.

In Example 3, the subject matter of any one or more of Examples 1-2 optionally include wherein the carbon substrate comprises carbon fibers.

In Example 4, the subject matter of Example 3 optionally includes wherein the carbon substrate comprises woven polyacrylonitrile carbon fibers.

In Example 5, the subject matter of any one or more of Examples 1-4 optionally include wherein the metal organic framework is a reaction product of a metal ion source and a ligands solution.

In Example 6, the subject matter of Example 5 optionally includes wherein the ion source comprises nickel nitrate hexahydrate.

In Example 7, the subject matter of any one or more of Examples optionally include -methylimidazole.

Example 8 is a carbon fiber reinforced polymeric composite comprising: a first layer comprising: a carbon substrate; and a metal organic framework bonded to the carbon substrate; a second layer comprising: a carbon substrate; and a metal organic framework bonded to the carbon substrate; and a resin adhered to the first layer and the second layer.

Example 9, the subject matter of Example 8 optionally includes wherein the resin comprises a polymeric resin.

In Example 10, the subject matter of any one or more of Examples optionally include wherein the resin comprises one or more resins chosen from a thermoset resin, a thermoplastic resin, a phenolic resin, a vinyl ester resin, a polyimide resin, an epoxy resin, an acrylic resin, an acrylate resin, a cyanoacrylate resin, cyano-urethane resin, a polysiloxane resin, or a mixture thereof.

In Example 11, the subject matter of any one or more of Examples 8-10 optionally include wherein the carbon substrate is made of carbon nanotubes.

In Example 12, the subject matter of any one or more of Examples 8-11 optionally include wherein the carbon substrate comprises carbon fibers.

In Example 13, the subject matter of Example 12 optionally includes wherein the carbon substrate comprises woven polyacrylonitrile carbon fibers.

In Example 14, the subject matter of any one or more of Examples 8-13 optionally include wherein the metal organic framework is a reaction product of a metal ion source and a ligands solution.

In Example 15, the subject matter of Example 14 optionally includes wherein the ion source comprises nickel nitrate hexahydrate.

In Example 16, the subject matter of Example 15 optionally includes wherein the ligand solution comprises 2-methylimidazole.

Example 17 is a method of forming a carbon fiber reinforced polymeric composite, the method comprising: forming a first substrate and a second substrate by: forming a metal ion solution by dissolving a metal ion source in methanol; forming a ligands solution by dissolving 2-methylimidazole in methanol; mixing the metal ion solution and the ligands solution; immersing the carbon fiber in the mixture; and washing and drying the carbon fiber; and adhering the first substrate to the second substrate using a resin.

In Example 18, the subject matter of Example 17 optionally includes wherein the ligand solution comprises 2-methylimidazole.

In Example 1.9, the subject matter of any one or more of Examples 17-18 optionally include wherein de-sizing includes heating the carbon fibers to 550 degrees Celsius for 30 minutes.

In Example 20, the subject matter of any one or more of Examples 17-49 optionally include wherein the ion source is nickel nitrate hexahydrate.

In Example 21, the subject matter of any one or more of Examples 17-20 optionally include de-sizing carbon fibers; soaking the carbon fibers in a water and acid bath; washing the carbon fibers; and drying the carbon fibers.

In Example 22, the subject matter of any one or more of Examples 17-21 optionally include wherein soaking the carbon fibers in a water and acid bath includes soaking the carbon fibers in a mixture of de-ionized water and $HNO_3$ acid.

In Example 23, the subject matter of any one or more of Examples 17-22 optionally include stirring the metal ion solution, magnetically; and stirring the ligands solution, magnetically.

Example 24 is a method of forming carbon nanotubes using a metal organic framework, the method comprising: producing a metal organic framework by: forming a metal ion solution by dissolving a metal ion source in methanol; forming a ligands solution by dissolving 2-methylimidazole in methanol; and mixing the metal ion solution and the ligands solution; and forming carbon nanotubes within or around the metal organic framework.

In Example 25, the subject matter of Example 24 optionally includes-methylimidazole.

In Example 26, the subject matter of any one or more of Examples 24-25 optionally include wherein the ion source is nickel nitrate hexahydrate.

In Example 27, the subject matter of any one or more of Examples 24-26 optionally include stirring the metal ion solution, magnetically; and stirring the ligands solution, magnetically.

In Example 28, the subject matter of any one or more of Examples 24-27 optionally include wherein forming carbon nanotubes within the metal organic framework includes: inserting the metal organic framework into a gas reactor; removing excessive oxides from the metal organic framework by flowing a gas mixture of $H_2/N_2$ over the metal organic framework at 550 degrees Celsius for two hours; flushing the gas reactor with $N_2$ gas; filling the reactor with $C_2H_4/H_2/N_2$ gas; and heating the reactor to 550 degrees Celsius for 30 minutes.

Example 29 is a reinforced glass composite comprising: a fiberglass substrate; and a metal organic framework bonded to the fiberglass substrate.

Example 30 is a reinforced composite comprising: a substrate; and a metal organic framework bonded to the substrate.

In Example 31, the subject matter of Example 30 optionally includes wherein the substrate is fiberglass or carbon fiber.

Example 32 is a three-dimensional printed component formed of carbon fiber reinforced polymeric composite as shown and described herein.

Example 33 is a method for fabricating a carbon fiber reinforced polymeric composite as shown and described herein.

Example 34 is a method of forming carbon fiber nanotubes supported by a metal organic framework as shown and described herein.

Example 35 is a fiber reinforced polymeric composite comprising: a substrate; and a metal organic framework bonded to the substrate.

In Example 36, the apparatuses or method of any one or any combination of Examples 1-35 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described. (or one or more aspects thereof), either with respect to a particular example (pr one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A reinforced carbon composite comprising:
a carbon fiber substrate comprising a plurality of woven polyacrylonitrile-based carbon fibers;
a metal organic framework bonded to the carbon fiber substrate; and
carbon fiber nanotubes grown onto respective ones of the plurality of carbon fibers.

2. The reinforced carbon composite of claim 1, wherein the metal organic framework is a reaction product of a metal ion source and a ligand solution.

3. The reinforced carbon composite of claim 2, wherein the metal ion source comprises nickel nitrate hexahydrate.

4. The reinforced carbon composite of claim 2, wherein the ligand solution comprises 2-methylimidazole.

5. The reinforced carbon composite of claim 1, wherein the plurality of carbon fibers have a diameter between 100 nanometers to less than 250 nanometers.

6. The reinforced carbon composite of claim 1, wherein the carbon fiber nanotubes have a diameter between 6.8 nanometers to less than 30 nanometers.

7. A carbon fiber reinforced polymeric composite comprising:
a first layer comprising:
a carbon fiber substrate comprising a first plurality of carbon fibers;
a metal organic framework bonded to the carbon fiber substrate; and
carbon fiber nanotubes grown onto respective ones of the first plurality of carbon fibers;
a second layer comprising:
a carbon fiber substrate comprising a second plurality of carbon fibers;
a metal organic framework bonded to the carbon fiber substrate; and
carbon fiber nanotubes grown onto respective ones of the second plurality of carbon fibers; and
a resin adhered to the first layer and the second layer.

8. The carbon fiber reinforced polymeric composite of claim 7, wherein the resin comprises a polymeric resin.

9. The carbon fiber reinforced polymeric composite of claim 7, wherein the resin comprises one or more resins chosen from a thermoset resin, a thermoplastic resin, a phenolic resin, a vinyl ester resin, a polyimide resin, an epoxy resin, an acrylic resin, an acrylate resin, a cyanoacrylate resin, cyano-urethane resin, a polysiloxane resin, or a mixture thereof.

10. The carbon fiber reinforced polymeric composite of claim 7, wherein the carbon fiber substrate comprises woven polyacrylonitrile carbon fibers.

11. The carbon fiber reinforced polymeric composite of claim 7, wherein the metal organic framework is a reaction product of a metal ion source and a ligand solution.

12. The carbon fiber reinforced polymeric composite of claim 11, wherein the metal ion source comprises nickel nitrate hexahydrate.

13. The carbon fiber reinforced polymeric composite of claim 12, wherein the ligand solution comprises 2-methylimidazole.

14. A reinforced carbon composite comprising:
a carbon fiber substrate comprising a plurality of carbon fibers;
a metal organic framework bonded to the carbon fiber substrate, wherein the metal organic framework is a reaction product of a metal ion source and a ligand solution, the metal ion source comprising a nickel nitrate hexahydrate; and
carbon fiber nanotubes grown onto respective ones of the plurality of carbon fibers.

15. The reinforced carbon composite of claim 14, wherein the carbon fiber substrate comprises woven polyacrylonitrile carbon fibers.

16. The reinforced carbon composite of claim 14, wherein the ligand solution comprises 2-methylimidazole.

17. The reinforced carbon composite of claim 14, wherein the plurality of carbon fibers have a diameter between 100 nanometers to less than 250 nanometers.

18. The reinforced carbon composite of claim 14, wherein the carbon fiber nanotubes have a diameter between 6.8 nanometers to less than 30 nanometers.

\* \* \* \* \*